(12) United States Patent  (10) Patent No.: US 9,052,873 B2
Murakata et al.  (45) Date of Patent: Jun. 9, 2015

(54) ELECTRONIC APPARATUS

(75) Inventors: Masato Murakata, Hyogo (JP); Jun Sato, Osaka (JP); Kenichi Shindo, Osaka (JP); Yoshihiro Kawada, Osaka (JP); Toshiya Senoh, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 280 days.

(21) Appl. No.: 13/222,657

(22) Filed: Aug. 31, 2011

(65) Prior Publication Data

US 2012/0106043 A1 May 3, 2012

(30) Foreign Application Priority Data

Aug. 31, 2010 (JP) ................................. 2010-194244
Mar. 29, 2011 (JP) ................................. 2011-072273

(51) Int. Cl.
  *G06F 1/16* (2006.01)
(52) U.S. Cl.
  CPC .............. *G06F 1/166* (2013.01); *G06F 1/1626* (2013.01)
(58) Field of Classification Search
  CPC .............................. G06F 1/1626; G06F 1/166
  USPC ............ 361/679.55–679.59, 679.01–679.45; 248/917–924
  See application file for complete search history.

(56) References Cited

U.S. PATENT DOCUMENTS

| 5,235,495 | A |   | 8/1993  | Blair et al. |
| 5,323,290 | A | * | 6/1994  | Blair et al. ............... 361/679.26 |
| 5,375,076 | A |   | 12/1994 | Goodrich et al. |
| 6,016,248 | A | * | 1/2000  | Anzai et al. .............. 361/679.59 |
| 6,665,176 | B2|   | 12/2003 | Amemiya et al. |
| 7,450,372 | B2| * | 11/2008 | Lin et al. ................... 361/679.55 |
| 7,660,113 | B2| * | 2/2010  | Kaneko ..................... 361/679.59 |
| 7,898,796 | B2|   | 3/2011  | Horie |
| 7,916,478 | B2|   | 3/2011  | Tu et al. |
| 8,045,323 | B2|   | 10/2011 | Murakata |
| 8,243,444 | B2|   | 8/2012  | Kawada et al. |
| 8,400,767 | B2|   | 3/2013  | Yeom et al. |
| 8,405,981 | B2|   | 3/2013  | Takemasa et al. |
| 2002/0181193 | A1 |   | 12/2002 | Amemiya et al. |
| 2005/0257341 | A1 | * | 11/2005 | Chen et al. ..................... 16/17.1 |

(Continued)

FOREIGN PATENT DOCUMENTS

| JP | 4-273283   | 9/1992 |
| JP | 11-259171  | 9/1999 |

(Continued)

OTHER PUBLICATIONS

Specification of co-pending U.S. Appl. No. 13/222,621.

*Primary Examiner* — Nidhi Thaker
(74) *Attorney, Agent, or Firm* — Hamre, Schumann, Mueller & Larson, P.C.

(57) ABSTRACT

Provided is an electronic device that is user-friendly in both hand-held use and table-placed use, and furthermore is highly reliable with respect to external impact. The electronic device includes a main body part and a support member. The support member connected by the connection part are attached to a pivot shaft that is disposed on the rear surface side of the main body part, such that the support member can pivot from a position at which the connection part protrudes outward beyond an outer edge of the main body part in a plan view from the front surface side of the main body part. At least a portion of the support member is at the same position as or a position more rearward than the portion of the main body part that protrudes the most rearward.

7 Claims, 22 Drawing Sheets

(56) References Cited

U.S. PATENT DOCUMENTS

| | | |
|---|---|---|
| 2006/0050471 A1* | 3/2006 | Chen ............................ 361/681 |
| 2006/0050472 A1 | 3/2006 | Chen |
| 2006/0077623 A1* | 4/2006 | Yeh ............................. 361/681 |
| 2006/0082957 A1* | 4/2006 | Chen ............................ 361/681 |
| 2006/0241830 A1* | 10/2006 | Schmeisser et al. ............ 701/29 |
| 2007/0076362 A1 | 4/2007 | Lagnado |
| 2007/0238340 A1 | 10/2007 | Ohira et al. |
| 2010/0014229 A1 | 1/2010 | Horie |
| 2012/0020019 A1* | 1/2012 | Chen et al. ............... 361/679.59 |

FOREIGN PATENT DOCUMENTS

| | | |
|---|---|---|
| JP | 2000-124622 | 4/2000 |
| JP | 2002-368443 | 12/2002 |
| JP | 2007-048326 | 2/2007 |
| JP | 2007-281258 | 10/2007 |
| JP | 2008-176599 | 7/2008 |
| WO | WO 2008/117463 | 10/2008 |

* cited by examiner

ELECTRONIC APPARATUS

BACKGROUND OF THE INVENTION

1. Field of the Invention

The present invention relates to an electronic apparatus including a display panel, and in particular relates to an electronic apparatus in which a support member for supporting the electronic apparatus is pivotally attached to the rear surface of a main body part of the electronic apparatus.

2. Description of Related Art

Electronic circuits have become increasingly smaller and lighter in weight, and improvements have been made in the performance of secondary batteries that supply drive voltage. Thus electronic apparatuses have become increasingly mobile.

With portable electronic apparatuses such as a computer for mobile use, a personal digital assistant (PDA), a portable gaming device, and a mobile phone, it has become prevalent for such devices to be a portable electronic apparatus that includes a display panel having touch panel functionality for the input of information. Recent years have seen the appearance of personal computers called "tablet personal computers" that can have a smaller overall device size and display information in a larger area since information is basically input using a touch panel instead of a keyboard and switch buttons. Such tablet personal computers rapidly have begun to become widely used due to positive reception for the diversity of use modes and the novel design of a shallow box-shaped casing without a keyboard.

With mobile electronic apparatuses such as these electronic apparatuses including a display panel having touch panel functionality as an input device, it is conceivable to have a use mode in which the device is operated while being held in the user's hands, and a use mode in which the device is operated while being placed on a table such as a desk. When held by hand, it is desirable for the electronic apparatus to be held reliably, and when used on a table, it is desirable for the inclination of the display panel to be fixed at an angle that is preferable in terms of operation of the touch panel and the viewing of display images.

In order to achieve both holding and placement of an electronic apparatus suited to such user use modes, an electronic apparatus including a pivoting stand on the rear surface of a main body part of the electronic apparatus has been proposed (JP H11-259171A).

As shown in FIGS. 22A and 22B, this conventional electronic apparatus 500 includes a display panel 502 having touch panel functionality on the front surface of a shallow, substantially rectangular main body part 501, and includes a stand 503 pivotally attached by a pivot mechanism 504 to the rear surface of the main body part 501, which is on the rearward side of the display panel 502.

With the conventional electronic apparatus 500 disclosed in the above patent literature, the pivot mechanism 504 has a structure that enables the inclination of the stand 503 relative to the rear surface of the main body part 501 to be fixed at an arbitrary angle.

In the case where the electronic apparatus 500 is placed on a table 505 such as a desk, as shown in FIG. 22A, an inclination angle α relative to the rear surface of the main body part 501 of the stand 503 is adjusted in order to set an angle β formed between the main body part 501 and the table 505 to a desired angle, thus enabling the user to accurately touch the touch panel on the display surface of the display panel 502 with a touch pen 506 or the like.

Also, in the case where the electronic apparatus 500 is used while being held in a hand 508, as shown in FIG. 22B, the user grabs the upper edge of the main body part 501 with their fingertips, while inserting their wrist between the main body part 501 and a hand placement part, which is a portion of the stand 503 that is parallel with the main body part 501, such that an anti-slip tube 507 provided on the hand placement part comes into contact with the back side of the wrist portion of the user's hand 508. This reduces the chances of the electronic apparatus 500 being dropped when being used while being held by hand.

According to the technology disclosed in the above patent literature, the stand 503 provided on the rear surface side of the main body part 501 is used in order to set a desired inclination for the electronic apparatus in the case of being used while being placed on the table 505, as well as to bring the anti-slip tube 507 into contact with the back side of the wrist in the case of being used while being held by hand so as to prevent the electronic apparatus 500 from being dropped.

However, with the conventional electronic apparatus 500, even in the case where the stand 503 is pivoted so as to cling to the rear surface of the main body part 501, that is to say, the case where the pivot angle α in FIG. 22A is set to 0 degrees, the hand placement part of the stand 503 remains within the area of the rear surface of the main body part 501, and does not protrude upward from the main body part 501. For this reason, in the case where the electronic apparatus 500 is used while being held by hand, the user can insert the hand 508 between the main body part 501 and the stand 503, but cannot utilize the stand 503 for reliable holding of the electronic apparatus 500. Specifically, the stand 503 of the conventional electronic apparatus 500 only functions as a strap for preventing free fall, and the holding of the electronic apparatus 500 is basically dependent on the strength of the fingertips of the user who is gripping the upper edge of the main body part 501. With such a holding method, if the size or weight of the electronic apparatus 500 is increased, and furthermore the electronic apparatus 500 is used while being held by hand for an extended period of time, a large burden is placed on the user.

Also, with the conventional electronic apparatus 500, in the case where the stand 503 has been pivoted so as to cling to the rear surface of the main body part 501 (the case where α=0 degrees), the stand 503 enters a storage state of being sunk inside a depression formed in the rear surface of the main body part 501, and thus the stand 503 is not the portion protruding the most rearward on the rear surface of the main body part 501. For this reason, in the case where the electronic apparatus 500 is accidentally dropped, the stand 503 cannot achieve the function of protecting the electronic apparatus 500 from external impact.

SUMMARY OF THE INVENTION

The present invention resolves such issues, and it is an object thereof to obtain an electronic apparatus that is user-friendly in both hand-held use and table-placed use, and furthermore is highly reliable with respect to external impact.

In order to resolve the above-described issues, an electronic apparatus according to the present invention includes: a main body part that has a front surface on which a display panel is disposed and a rear surface that corresponds to a reverse surface of the front surface and is positioned on a rearward side of the front surface, the main body part being substantially rectangular in shape in a plan view from the front surface side; and a support member that has a pair of leg parts and a connection part that connects end parts on one side of the pair of leg parts to each other, wherein other end parts of the leg parts that are on a side different from the end parts connected by the connection part are attached to a pivot shaft that is disposed on the rear surface side of the main body part, such that the support member can pivot from a position at which the connection part protrudes outward beyond an outer edge of the main body part in a plan view from the front surface side of the main body part, and at least a portion of the support member is at the same position as or a position more rearward than a portion of the main body part that protrudes the most rearward.

According to the electronic apparatus of the present invention, the support member is attached to the rear surface side of the main body part so as to be able to pivot from a position at which the support member protrudes outward beyond the outer edge of the main body part. This enables the support member to be used directly in holding, the electronic apparatus in the case where the electronic apparatus is operated in a hand-held state, and enables the support member to be used as a stand for the electronic apparatus in the case where the electronic apparatuses is used on a table. Also, since at least a portion of the support member is at the same position as or a more rearward position than the portion of the rear surface of the main body part that protrudes the most rearward, external impact can be absorbed by the support member in the case where the electronic apparatus is accidentally dropped. This enables realizing an electronic apparatus that is user-friendly and highly reliable.

DETAILED DESCRIPTION OF THE INVENTION

Figure 1:
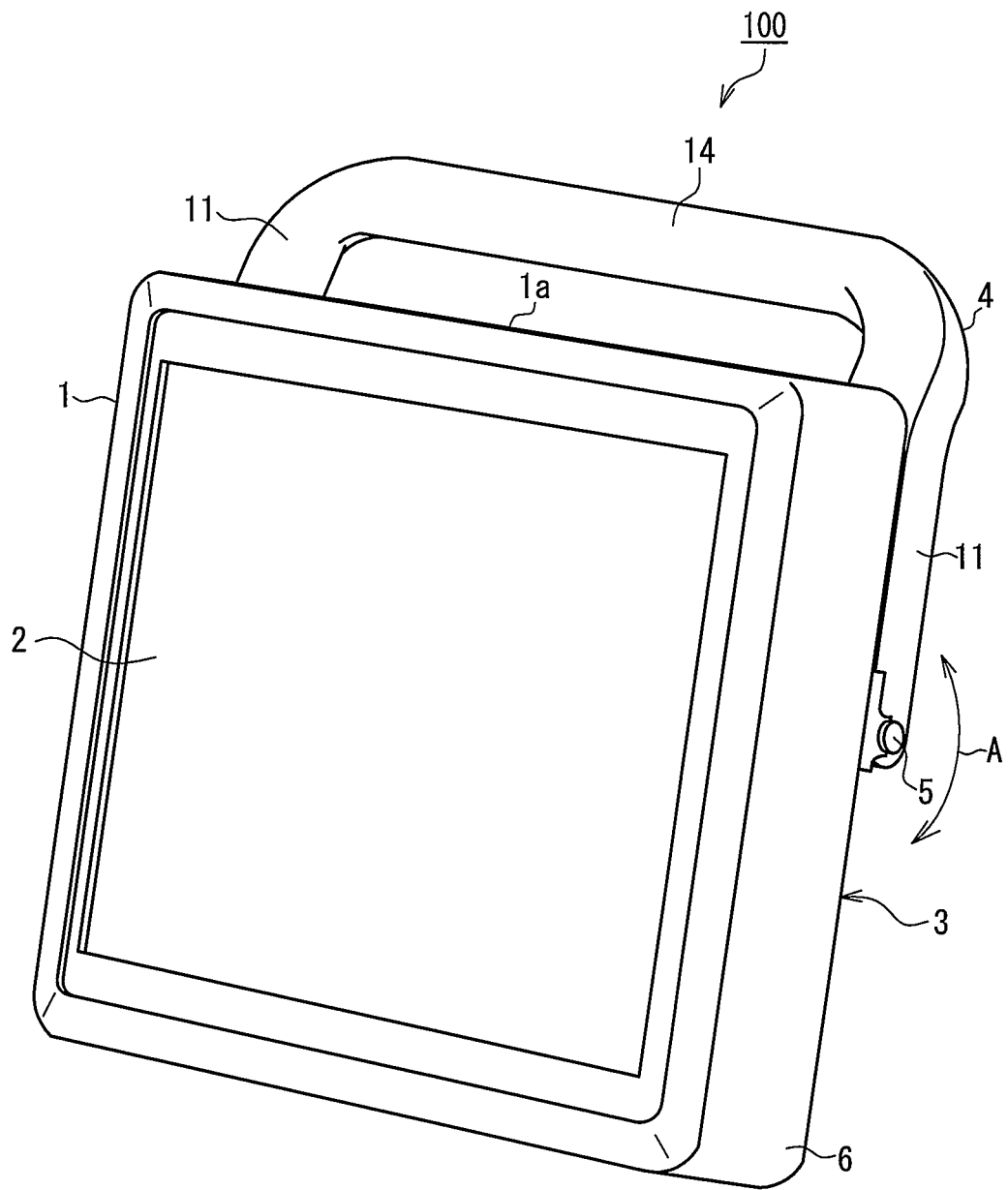
FIG. 1 is a perspective diagram showing an external configuration of a tablet personal computer according to a first embodiment.

An electronic apparatus according to the present invention includes: a main body part that has a front surface on which a display panel is disposed and a rear surface that corresponds to a reverse surface of the front surface and is positioned on a rearward side of the front surface, the main body part being substantially rectangular in shape in a plan view from the front surface side; and a support member that has a pair of leg parts and a connection part that connects end parts on one side of the pair of leg parts to each other. Other end parts of the leg parts that are on a side different from the end parts connected by the connection part are attached to a pivot shaft that is disposed on the rear surface side of the main body part, such that the support member can pivot from a position at which the connection part protrudes outward beyond an outer edge of the main body part in a plan view from the front surface side of the main body part, and at least a portion of the support member is at the same position as or a position more rearward than a portion of the main body part that protrudes the most rearward.

Due to the electronic apparatus according to the present invention including the above configuration, the user who is using the electronic apparatus in the hand-held state can hold the electronic apparatus, securely by directly gripping the connection part of the support member or putting their fingertips on the connection part while the support member is at the position of protruding from the outer edge of the main body part. Also, the support member can be pivoted and used as a stand when the electronic apparatus is used on a table, and the display panel can be kept at a desired angle. Furthermore, since at least a portion of the support member is at the same position as or a more rearward position than the portion of the main body part that protrudes the most rearward, even if the electronic apparatus is accidentally dropped, the support member is subjected to external impact at the same time as or before the main body part, thus making it possible to mitigate the impact to which the rear surface of the main body part is subjected.

It is preferable that in the above configuration, the support member further has, between the one end parts and the other end parts of the leg parts, a bridge part that connects the leg parts to each other. According to this configuration, the rigidity of the support member can be increased, and the bridge part can be used in holding when the electronic apparatus is used in the hand-held state.

Also, it is preferable that the pivot shaft is, relative to a center line that bisects the rear surface in a direction perpendicular to a shaft direction of the pivot shaft, disposed on a side of the center line on which the outer edge from which the connection part of the support member protrudes is disposed. According to this configuration, the connection part of the support member can be allowed to protrude from the outer edge of the main body part without increasing the length of the leg parts of the support member more than necessary. Also, by causing the support member to fit within the region of the rear surface of the main body part when the support member has been fully rotated, it is possible to reduce the volume of the space enclosing the electronic apparatus and achieve a compact storage state.

Furthermore, a pivot mechanism by which the support member is pivotally attached to the main body part can fix the support member in an arbitrary pivot position. This configuration enables placing the electronic apparatus on a table surface with the display panel in a state of being at an arbitrary inclination angle desired by the user.

Moreover, the support member may have a foot part at a position at which the foot part comes into contact with a table surface when the support member is in a position in which the support member can support the main body part on the table surface in a posture in which the front surface is inclined, and the foot part protrudes from the surface of the support member. This configuration enables increasing the area of contact between the support member and the table surface, and enables the electronic apparatus to be used while being stably placed on the table surface.

Also, it is preferable that the leg parts of the support member each have an inclined portion that causes the connection part to be separated rearward from the rear surface of the main body part in a state in which the connection part of the support member protrudes outward beyond the outer edge of the main body part. According to this configuration, the connection part can be gripped more easily in the case of hand-held use, and the burden on the user can be reduced. Also, in the case where the electronic apparatus has been dropped, the inclined portions deform in a direction such that the impact of the drop is absorbed, thus enabling more reliable protection of the main body part from external impact.

Furthermore, it is preferable that when the support member is in a position at which the connection part of the support member protrudes the most outward beyond the outer edge of the main body part, the connection part is positioned at a position that overlaps the center of gravity of the main body part in a vertical direction. This configuration enables transporting the electronic apparatus in a stable posture in the case of being transported using the connection part of the support member.

Another electronic apparatus according to the present invention includes: a main body part that has an electronic part built therein, and that has a front surface on which a display panel is disposed, a rear surface that opposes the front surface via a gap, and a side surface that spans the gap; and a support member that is pivotally attached to the main body part. The support member has a connection part that can be gripped by a user, and the support member can be displaced to a first pivot position at which the connection part protrudes from the side surface of the main body part and a second pivot position at which the support member can support the main body part on the rear surface in a posture in which the front surface is inclined.

Also, it is preferable that the main body part is fixed to a main body support part that has a frame-shaped member that covers at least a portion of a side surface of the main body part, and the support member is attached to the main body part via the main body support part. This configuration enables easily obtaining an electronic apparatus whose main body part is provided with a necessary support member.

Hereinafter, embodiments of an electronic apparatus according to the present invention will be described by way of example of a tablet personal computer that includes a liquid crystal display panel having touch panel functionality.

First Embodiment

FIG. 1 is a perspective diagram showing the exterior of a tablet personal computer 100 that serves as the electronic apparatus of the present embodiment and includes a liquid crystal panel having touch panel functionality as a display panel.

As shown in FIG. 1, in the tablet personal computer 100 of the present embodiment, a touch panel-equipped liquid crystal panel 2 serving as the display panel having touch panel functionality is disposed on the front surface side of a main body part 1. Also, a support member 4 is attached so as to be able to pivot relative to the main body part 1 using a pivot shaft 5, on a rear surface 3 of the main body part 1, that is to say, the surface on the reverse side of the front surface on which the touch panel-equipped liquid crystal panel 2 is formed, or on a rear surface that is a surface that can be grasped as a surface opposing the front surface via a gap. In a plan view from the front surface side of the tablet personal computer 100 on which the touch panel-equipped liquid crystal panel 2 is disposed, the support member 4 is able to, as indicated by arrow A in FIG. 1, pivot from a position at which a connection part 14, which connects end parts on one side of a pair of leg parts 11 to each other, protrudes outward (upward in FIG. 1) beyond an outer edge 1a of the main body part 1. Note that the front surface side is the side of the tablet personal computer 100 on which the display panel is disposed, that is to say, the direction of the left near side in FIG. 1, and rearward is the direction of the rear surface side of the main body part, that is to say, the direction of the right far side in FIG. 1. Also, in the case where the rear surface is assumed to be the surface opposing the front surface via a gap, one of the side surfaces spanning the gap can be said to be the surface forming the outer edge 1a of the main body part 1.

The main body part 1 has the front surface on which the touch panel-equipped liquid crystal panel 2 is disposed and the rear surface 3 positioned on the rearward side, is substantially rectangular in a plan view from the front surface side, and overall is shaped as an oblate cuboid that has a small dimension in the thickness direction, which is the front-back direction. Here, "substantially rectangular" refers to the shape of the main body part 1 in a plan view from the front being basically a quadrangle enclosed by four sides, and does not mean only a perfect rectangle or square. Accordingly, there are cases where the four corner portions are rounded or chamfered, and all or some of the four sides may be curved a little outward or inward. Furthermore, the rear surface corresponding to the reverse side of the front surface on which the touch panel-equipped liquid crystal panel 2 is disposed may be formed as an uneven surface taking into consideration, for example, the shape and disposed positions electrical circuit parts housed inside the main body part 1.

Housed and stored inside the main body part 1 are various types of electronic parts and electrical circuit members constituting a personal computer, examples of which include a CPU, a memory, a storage device such as a hard disk, a power supply circuit for driving such parts, and furthermore a battery and an antenna element.

The periphery of the main body part 1 of the tablet personal computer 100 according to the present embodiment is covered by a resin member 6 that is a so-called "elastomer" having a relatively high hardness and deforming/restoring ability, such as a polyether, an internal plasticizing polyester, an ether-modified polyester, or the like, and when the tablet personal computer 100 is subjected to external impact, the resin member 6 absorbs as much of the external impact as possible. The resin member 6 encloses the peripheral portion of the touch panel-equipped liquid crystal panel 2 in the manner of a frame, and therefore the touch panel surface of the touch panel-equipped liquid crystal panel 2 is a recessed surface that is slightly more recessed than the peripheral portion.

The touch panel-equipped liquid crystal panel 2 is overlaid on the front surface side (i.e., the image display surface) of a transmissive liquid crystal panel, in which a transparent touch panel serves as the display panel, and images displayed by the liquid crystal panel are visible through the touch panel. Also, when the outer surface of the touch panel, that is to say, the surface on the front surface side of the liquid crystal panel on which display images are viewed, is pressed by a fingertip, an input pen, or the like in accordance with a displayed image, the position that was pressed can be detected, and input information can be reflected in the control of the tablet personal computer 100.

In the tablet personal computer 100 of the present embodiment, the touch panel stacked on the image display surface of the transmissive liquid crystal panel is a so-called projected capacitive touch panel in which a transparent conductive film made of ITO (Indium Tin Oxide) or the like is formed in a predetermined pattern on a transparent substrate. Although a projected capacitive touch panel is used as the touch panel of the tablet personal computer 100 of the present embodiment due to the ability to detect touches at multiple places, that is to say, the ability to support so-called multitouch, the touch panel of the tablet personal computer 100 of the present embodiment is not limited to this type of touch panel, and may be any of various types of touch panels, such as a surface capacitive or resistive touch panel.

Also, although the touch panel-equipped liquid crystal panel 2 has been described with the example of separately forming a touch panel and a liquid crystal panel serving as the display element and overlaying them, the display panel having touch panel functionality is not limited to a form in which two panels are stacked in this way, and may have a configuration in which the front surface glass of the liquid crystal panel also serves as a constituent member of the touch panel. Furthermore, it is possible to use a liquid crystal input/output panel in which light receiving elements are included inside the display pixels of a liquid crystal panel, and the display of images and the detection of a touched position are performed using a single panel. Of course, the display panel is also not limited to being a transmissive liquid crystal panel, and can be any of various types of flat display panels, such as a reflective liquid crystal panel, an organic or inorganic electroluminescent (EL) panel, or a plasma display panel (PDP), as well as a field emission display panel.

The support member 4 is formed from a hard and elastic resin such as a polyether, an internal plasticizing polyester, or an ether-modified polyester, and in the tablet personal computer 100 of the present embodiment, the support member 4 is attached so as to be able to pivot in the direction of arrow A in FIG. 1 on the rear surface side of the main body part 1, using the pivot shaft 5 that is disposed directly on the rear surface 3 of the main body part 1. Note that as will be described later, the pivot shaft for pivotally attaching the support member to the main body part can be disposed on the rear surface of the main body part indirectly via another member, instead of being directly disposed thereon. In other words, there are no particular constraints on the attachment mechanism as long as the support member can be attached so as to be able to pivot relative to the main body part.

Figure 2:
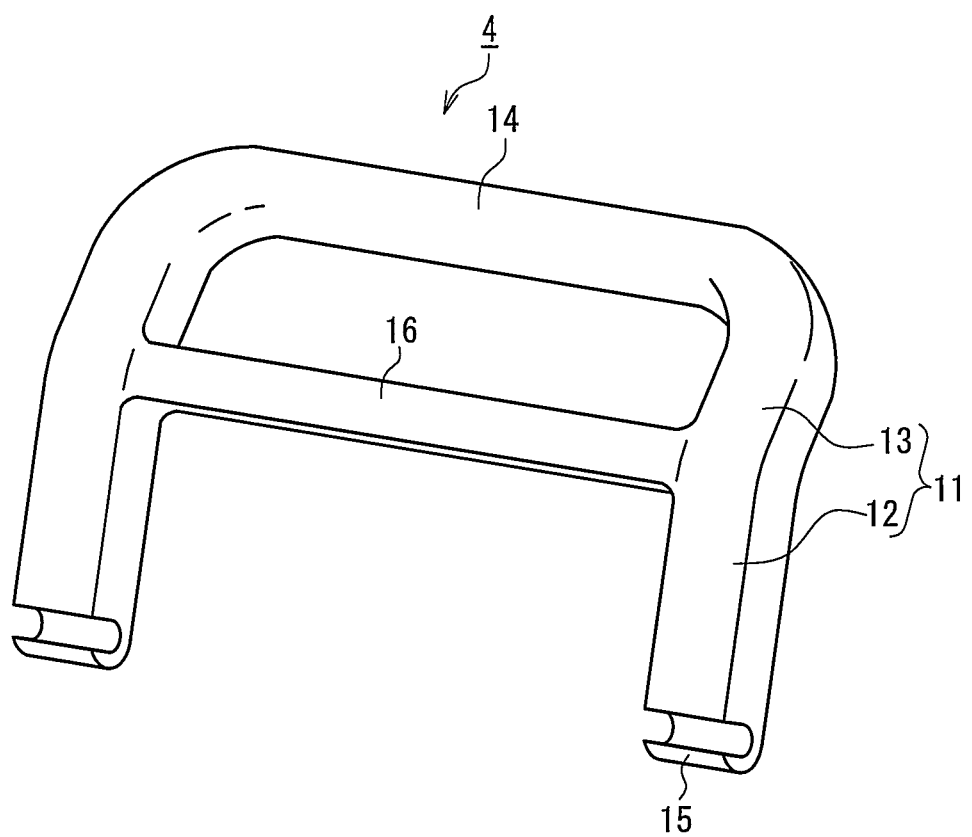
FIG. 2 is a perspective diagram showing a configuration of a handle of the tablet personal computer according to the first embodiment.

FIG. 2 is a perspective diagram showing the configuration of the support member 4 used in the tablet personal computer 100 of the present embodiment.

As shown in FIG. 2, the support member 4 has the pair of leg parts 11 and the connection part 14 that connects end parts on one side of the leg parts 11 to each other.

In the tablet personal computer 100 of the present embodiment, end parts of the leg parts 11 of the support member 4 that are on the side different from the end parts connected by the connection part 14 are tip parts 15 that can be fit together with the pivot shaft 5 disposed on the rear surface 3 of the main body part 1. Also, the leg parts 11 are each configured by a linear portion 12 on the tip part 15 side and an inclined portion 13 positioned closer to the connection part 14 than the linear portion 12 is.

Figure 3:
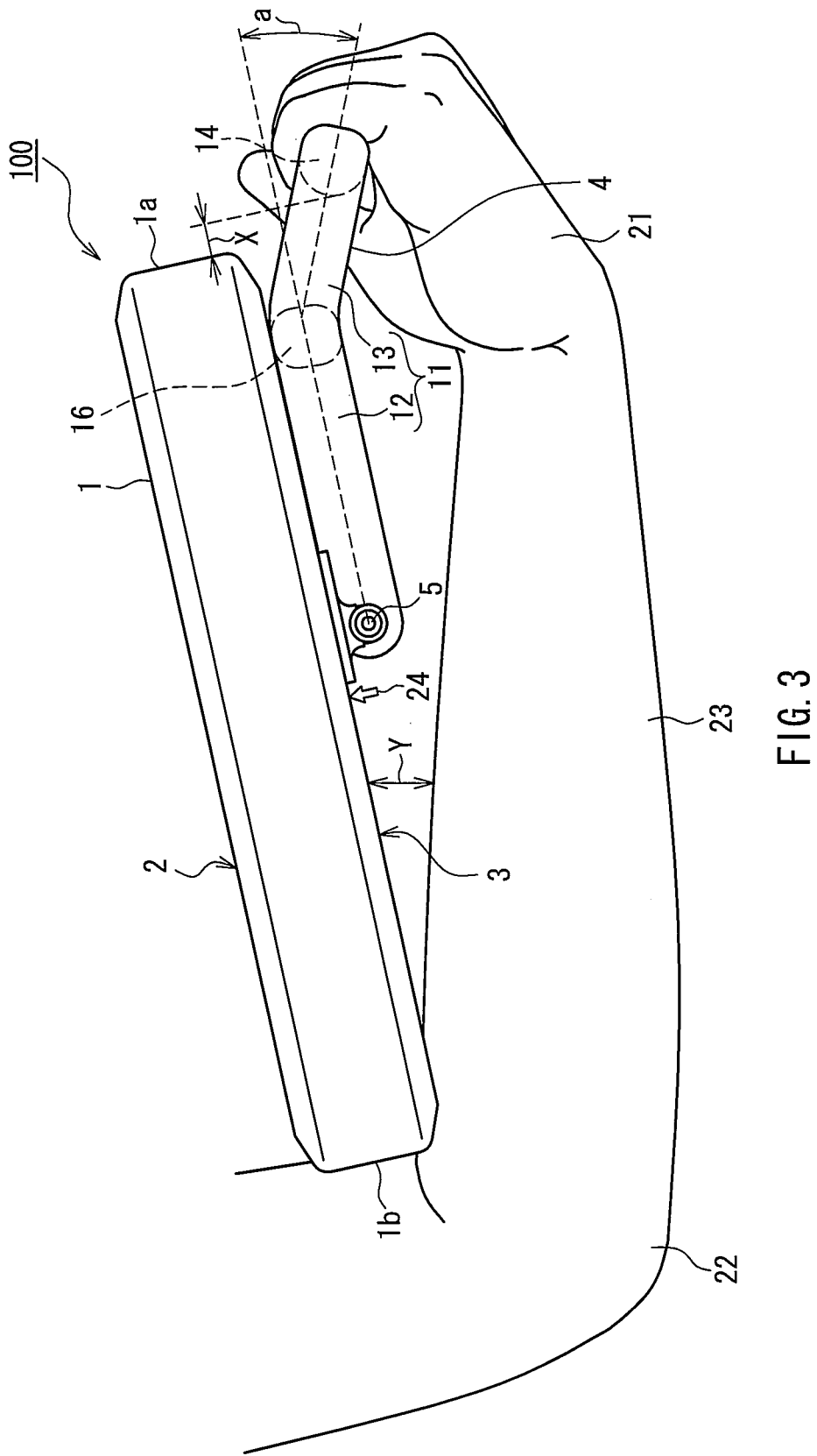
FIG. 3 is a side view showing how a user holds the tablet personal computer according to the first embodiment in a hand-held state.

In the state where the connection part 14 of the support member 4 of the tablet personal computer 100 according to the present embodiment protrudes from the outer edge 1a of the main body part 1, that is to say, the state where the support member 4 is, as shown in FIGS. 1 and 3, positioned upward in these figures on the rear surface 3 of the main body part 1, the inclined portions 13 are inclined in the direction in which the connection part 14 is separated from the rear surface 3 of the main body part 1 toward the rearward side. In this way, the leg parts 11 are provided with the inclined portions 13 so as to increase the distance between the connection part 14 and the rear surface 3 of the main body part 1, and thus the user can more easily grip the connection part 14 in the case of operating the tablet personal computer 100 in the hand-held state, as will be described later with reference to FIG. 3. Note that in this description, the state in which the support member 4 is positioned upward in the figures on the rear surface 3 of the main body part 1, and the connection part 14 of the support member 4 is closest to the front surface side is referred to as the state in which the support member 4 is in the first pivot position.

Since the connection part 14 functions as a grip (handle portion) for allowing the user to hold the tablet personal computer 100 as shown in the use state of FIG. 3, the connection part 14 is given a thickness in a certain range determined ergonomically, so as to prevent the user from becoming tired even after use over a moderately extended period of time. Specifically, the range of approximately 20 mm to 35 mm is preferable, but this of course does not exclude a connection part 14 having a thickness outside this numerical value range. Also, although not shown in the drawings, in order to make the connection part 14 more easily held by the user, it is possible to employ various techniques, such as forming the surface of the connection part 14 as a roughened surface, providing ridges and valleys to facilitate finger placement, and forming at least part of the surface using a flexible member.

In the support member 4 of the tablet personal computer 100 of the present embodiment, a bridge part 16 that connects the leg parts 11 to each other is formed in boundary portions between the linear portions 12 and the inclined portions 13 of the leg parts 11. The bridge part 16 improves the strength of the support member 4 itself, and increases the area of the portion of contact between the support member 4 and the rear surface 3 of the main body part 1 in the state where the leg parts 11 of the support member 4 are in contact with the rear surface 3 of the main body part 1 as will be described later, and therefore in the case where the support member 4 has been subjected to external force, the external force is transmitted to the main body part 1 in a distributed manner so as to prevent the main body part 1 from being damaged.

Note that by making innovations to the gap between the connection part 14 and the bridge part 16 and to the shape of the bridge part 16, it is possible to enable the tablet personal computer 100 to be held by, for example, the user inserting their fingers between the connection part 14 and the bridge part 16 as will be described later with reference to FIGS. 7 and 9. This enables the user to use the tablet personal computer 100 in a posture close to the hand-held state, without feeling the weight of the tablet personal computer 100. Also, the connection part 14 and the bridge part 16 can be used to fix the tablet personal computer 100 by hanging it on a protruding object such as a bicycle handle. In this case, the user can operate the tablet personal computer 100 using both hands.

Although the bridge part 16 of the support member 4 of the tablet personal computer 100 according to the present embodiment shown in FIG. 2 is provided in boundary portions between the linear portions 12 and the inclined portions 13 of the leg parts 11, this is not an essential requirement of the support member 4 of the present embodiment. The bridge part 16 may be provided in either the linear portions 12 or the inclined portions 13 instead of the boundary portions. Also, it is possible not to provide the bridge part 16, and multiple bridge parts 16 can be provided.

FIG. 3 is a diagram showing how the user holds the tablet personal computer 100 according to the present embodiment in the hand-held state, as viewed from the side.

As shown in FIG. 3, by gripping the connection part 14 of the support member 4, the user can hold the tablet personal computer 100 so as to be cradled on the inner side of a lower arm part 23. By optimizing a gap X between the connection part 14 and the outer edge 1a on the upper side of the main body part 1 and an angle a formed by the linear portions 12 and the inclined portions 13 of the leg parts 11 of the support member 4, the user can bring an outer edge 1b on the lower side of the main body part 1 into contact with an elbow 22 with the wrist 21 being bent a little inward, thus enabling the user to hold the tablet personal computer 100 in a stable state. The ability to stably hold the tablet personal computer 100 makes it easier to avoid the situation in which the tablet personal computer is dropped while being used in a hand-held state, as well as enables use for an extended period of time without feeling much of the weight of the tablet personal computer 100.

Also, due to the user bending the wrist 21a little when holding the tablet personal computer 100, a predetermined gap Y is formed between the rear surface 3 of the main body part 1 of the tablet personal computer 100 and the inner side of the user's lower arm part 23. Therefore even in the case where the main body part 1 of the tablet personal computer 100 reaches or exceeds a certain temperature due to, for example, heat generated by internal circuits and the battery, the user can use the tablet personal computer 100 without directly feeling the rise in the temperature of the main body part 1.

Note that it is preferable that the gap X between the connection part 14 and the outer edge 1a on the upper side of the main body part 1 and the angle a formed by the linear portions 12 and the inclined portions 13 of the leg parts 11 of the support member 4 are appropriately determined in consideration of the size and weight of the tablet personal computer 100, the envisioned length of the user's arm, and the like, such that when the user holds the tablet personal computer 100 in the hand-held state, the user can hold it stably and without become fatigued even in use for an extended period of time.

Figure 4:
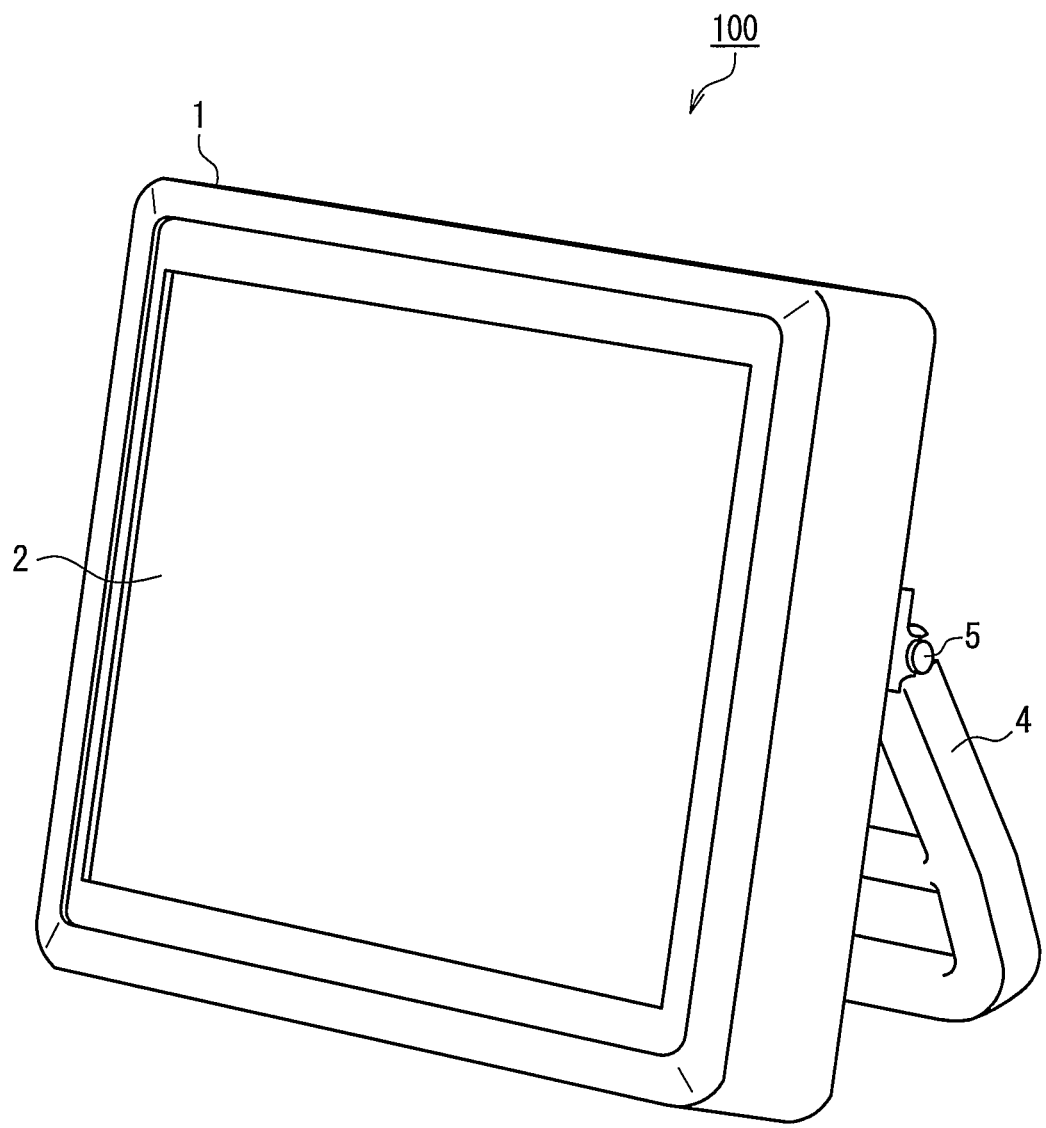
FIG. 4 is a perspective diagram showing a state in which the tablet personal computer according to the first embodiment is used while being placed on a table.

FIG. 4 shows the situation in which the tablet personal computer 100 of the present embodiment is used while being placed on a table (not shown) such as a desk.

As shown in FIG. 4, by pivoting the support member 4 of the tablet personal computer 100 according to the present embodiment about the pivot shaft 5 disposed on the rear surface 3 of the main body part 1, the support member 4 can be allowed to function as a stand, and the touch panel-equipped liquid crystal panel 2 can be inclined at a predetermined angle relative to the table. Accordingly, even in the mode where the tablet personal computer 100 is used by the user while being placed on a table, it is possible to improve the operability with respect to the input of information via the touch panel.

Figure 5:
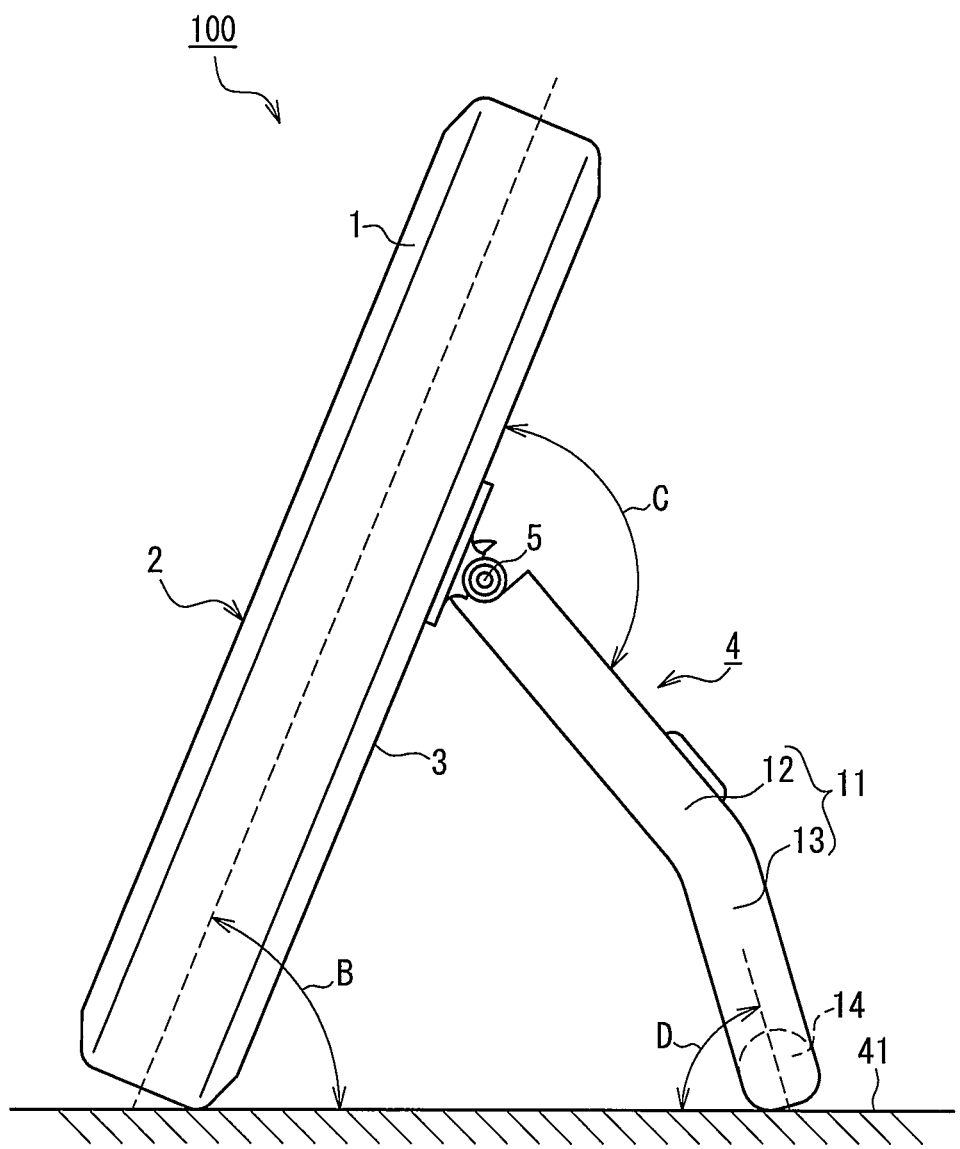
FIG. 5 is a side view showing a relationship between a support member and a table in the case where the tablet personal computer according to the first embodiment is put in a table-placed state.

FIG. 5 is a side view showing the angle of the support member 4 in the state of use on a table.

As shown in FIG. 5, in the case where the tablet personal computer 100 of the present embodiment is placed on a table 41, the support member 4 attached to the rear surface 3 of the main body part 1 functions as a stand. Specifically, an angle C formed between the main body part 1 and the linear portions 12 of the leg parts 11 of the support member 4 is adjusted such that the main body part 1, that is to say, the display surface of the touch panel-equipped liquid crystal panel 2 forms a predetermined angle B with the table 41. Here, in the state where the support member 4 has been pivoted to the lower side of the rear surface 3 of the main body part 1 as shown in FIG. 5, the inclined portions 13 of the leg parts 11 of the support member 4 according to the present embodiment are inclined with respect to the extending direction of the linear portions 12, in the direction approaching the rear surface 3 of the main body part 1. For this reason, an angle D formed between the table 41 and the inclined portions 13, which are on the side of the leg parts 11 near the connection part 14 that is placed on the table 41, is a large angle close to a right angle, and thus the support member 4 does not readily slide on the table 41 and can more stably function as a stand. Note that in this description, the state in which the support member 4 is pivoted to the lower side of the rear surface 3 of the main body part 3, and the touch panel-equipped liquid crystal panel 2 serving as the display panel of the main body part 1 can be supported in a posture inclined at the predetermined inclination angle B is referred to as the state in which the support member 4 is in the second pivot position.

Also, there are cases where it is preferable that the angle B formed between the table 41 and the surface of the touch panel-equipped liquid crystal panel 2 can be appropriately modified by the user in accordance with the software to be used in the tablet personal computer 100, or furthermore in accordance with, for example, the state of external irradiated light, such as outside light or light from an illumination lamp. For this reason, the pivot mechanism around the pivot shaft 5 attaching the support member 4 to the main body part 1 can given a configuration that enables the angle C formed between the main body part 1 and the linear portions 12 of the leg parts 11 of the support member 4 to be fixed at a predetermined arbitrary angle. Examples of such a mechanism include a mechanism such as that described later in detail in a second embodiment, or a known mechanism for pivoting and fixing by providing a gear-shaped stopper on the pivot shaft 5 of the pivot mechanism, providing a pressure plate that suppresses rotation of the pivot shaft 5, or the like.

Furthermore, as will be described later with reference to FIG. 17 and the like in the second embodiment, in the case where the support member 4 is used to place the tablet personal computer 100 on the surface of a table such as a desk, the support member 4 can be provided with foot parts at positions where the support member 4 comes into contact with the table surface. Since the connection part 14 has a substantially cylindrical shape in the support member 4 of the tablet personal computer 100 according to the present embodiment shown in FIG. 5, it is preferable that the foot parts are protruding objects provided so as to protrude outward from the connection part 14 on the side of the connection part 14 that faces the table 41, or are protruding objects shaped so as to have a flat surface that comes into contact with the table 41. Accordingly, in the case where the support member 4 is used as a stand, it is possible to reduce sliding between the support member 4 and table 41 and place the tablet personal computer 100 in a stable state.

Figure 6:
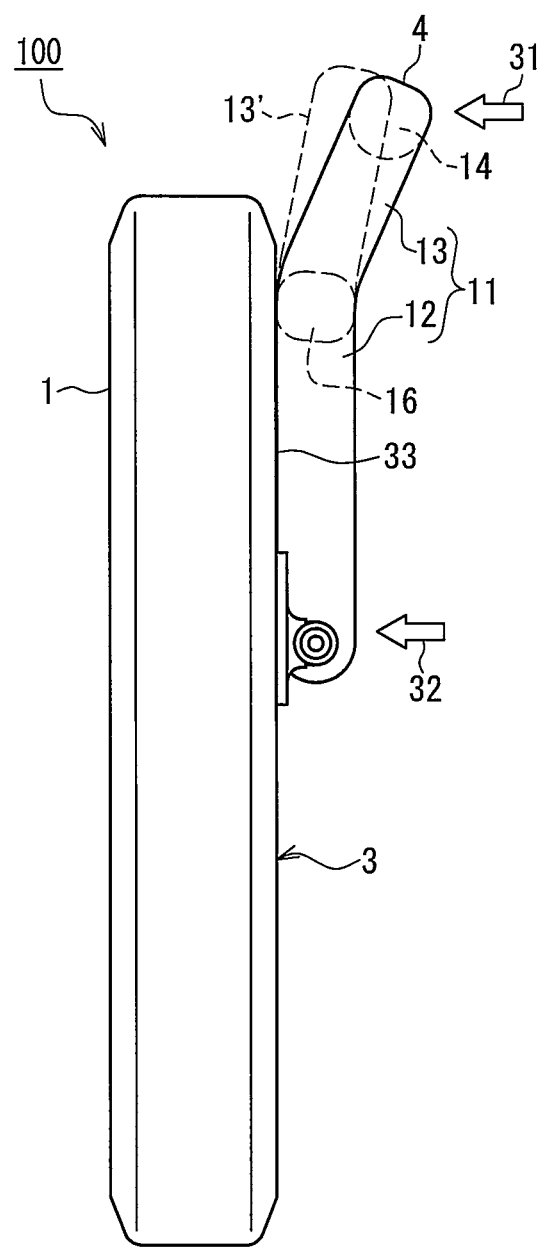
FIG. 6 is a side view for illustrating how the support member of the tablet personal computer according to the first embodiment has a function of absorbing external impact.

FIG. 6 is a side view for illustrating that the support member 4 of the tablet personal computer 100 according to the present embodiment has another function of absorbing external impact.

As shown in FIG. 6, in the case where the tablet personal computer 100 of the present embodiment is used in the hand-held state, and in the case where the connection part 14 of the support member 4 is used as a grip for carrying the tablet personal computer 100, the support member 4 is fixed in a state where the leg parts 11 cling to the upper side portion of the rear surface 3 of the main body part 1, that is to say, the state of being in the first pivot position. At this time, the support member 4, and particularly the connection part 14 thereof, is positioned more rearward than the portion of the main body part 1 that protrudes out the most on the rear surface side as shown in FIG. 6. For this reason, in the case where the rear surface 3 of the main body part 1 of the tablet personal computer 100 is subjected to external impact, such as the case where the tablet personal computer 100 is accidentally dropped with the touch panel-equipped liquid crystal panel 2 facing upward, the support member 4 is subjected to external force 31 and 32 indicated by white arrows in FIG. 6 before the rear surface 3 of the main body part 1 is.

In the tablet personal computer 100 of the present embodiment, the inclined portions 13 are provided in the leg parts 11 in the direction in which the connection part 14 of the support member 4 is separated from the rear surface 3 of the main body part 1. For this reason, although the connection part 14 of the support member 4, which is positioned the most rearward, is first subjected to the external force 31, the inclined portions 13 of the leg parts 11 function as dampers by flexing to the state indicated by broken lines in FIG. 6, and thus external impact can be absorbed by the support member 4.

Also, since the support member 4 of the tablet personal computer 100 of the present embodiment is provided with the bridge part 16, in the case where the support member 4 is subjected to the external force 31 and 32, the linear portions 12 of the leg parts 11 and the bridge part 16 form a substantially "U" shaped rejoin with square corners when they are pressed against the rear surface of the main body part 1. This helps distribute the external force transmitted from the support member 4 to the rear surface 3 of the main body part 1, and effectively prevents the rear surface 3 of the main body part 1 from being damaged due to being forcefully pressed against by the support member 4.

Note that as shown in FIG. 6, there are no ridges or valleys on the rear surface 3 of the main body part 1 of the tablet personal computer 100 according to the present embodiment, and the entirety of the support member 4 protrudes more rearward than the rear surface 3 of the main body part 1 does. However, there is no need for the entirety of the support member 4 of the tablet personal computer 100 according to the present embodiment to be more rearward than the rear surface 3 of the main body part 1 is. In particular, since the inclined portions 13 of the leg parts 11 are inclined in the direction of separation from the rear surface 3 of the main body part 1, even if, for example, the support member 4 according to the present embodiment is shaped such that at least a portion of the leg parts 11 are accommodated in a recess formed in the rear surface 3 of the main body part 1, the connection part 14 is positioned so as to protrude the most rearward. For this reason, the support member 4 receives external impact first, and can exhibit the function of preventing damage to the main body part 1.

Furthermore, even in the case where a protruding part is formed in the rear surface 3 of the main body part 1 in view of accommodating a circuit board, a battery, and other members built into the main body part 1, external impact to which the rear surface 3 of the main body part 1 is subjected can be received by the support member 4 due to the most rearward portion of the support member 4 being at the same position as or more rearward than the position of the most rearward portion of the protruding part, that is to say, the portion of the main body part 1 that protrudes the most rearward. This helps prevent the main body part 1 from being directly subjected to external force, and provides obtaining a highly reliable tablet personal computer 100 that is resistant to inadvertent accidents such as dropping.

As shown in FIG. 3, in the tablet personal computer 100 of the present embodiment, the pivot shaft 5 disposed on the rear surface 3 of the main body part 1 is, relative to a center line that bisects the rear surface 3 of the main body part 1 in the direction perpendicular to the shaft direction of the pivot shaft 5 (i.e., in the vertical direction), disposed on the side of the center line on which the outer edge 1a, which is on the side where the connection part 14 of the support member 4 protrudes, is disposed. Here, since FIG. 3 is a side view, the shaft direction of the pivot shaft 5 is the direction perpendicular to the paper plane, and the center line, which bisects the rear surface 3 in the direction perpendicular to the shaft direction of the pivot shaft 5, is a line that is positioned in the portion indicated by arrow 24 in FIG. 3, bisects the rear surface 3 of the main body part 1 in the vertical direction in FIG. 3, and extends in the direction perpendicular to the paper plane. In this way, by disposing the pivot shaft 5 so as to be, relative to the center line that bisects the rear surface 3 of the main body part 1 in the direction perpendicular to the shaft direction of the pivot shaft 5, on the side of the center line on which the outer edge 1a, which is on the side where the connection part 14 protrudes, is disposed, in the case where the support member 4 is pivoted about the pivot shaft 5 from the hand-held use state shown in FIG. 3, that is to say the first pivot position, beyond the second pivot position for use as a stand for placement on a table, to a third pivot position that is the full extent to which the support member 4 can pivot, the connection part 14 of the support member 4 comes into contact with the lower half of the rear surface 3, and in a plan view of the main body part 1 from the front surface side, the support member 4 can be completely hidden on the rear surface 3 side of the main body part 1.

With the tablet personal computer 100 of the present embodiment, since the volume of space enclosing the tablet personal computer 100 is minimized while the support member 4 is fully pivoted on the lower side of the main body part in this way, the state in which the support member 4 is in the third pivot position of having been fully pivoted can define the storage state in the case of storing the tablet personal computer 100.

Note that disposing the pivot shaft 5 of the support member 4 so as to be, relative to the center line that bisects the rear surface 3 of the main body part 1 in the direction perpendicular to the shaft direction of the pivot shaft 5, on the side of the center line on which the outer edge 1a, which is on the side where the connection part 14 protrudes, is disposed is not an essential requirement in the tablet personal computer 100 of the present embodiment, but doing this enables positioning the connection part 14 above the outer edge 1a of the main body part 1 with a gap indicated as the predetermined gap X in FIG. 3 above, without increasing the length of the leg parts 11 of the support member 4 more than necessary. This enables reducing the size of the support member 4 and avoiding an increase in the weight of the tablet personal computer 100. Also, since the length of the leg parts 11 of the support member 4 is not increased more than necessary, even in the case where the support member 4 is used as a stand by being pivoted such that the leg parts 11 are positioned in the lower side portion of the rear surface 3 of the main body part 1 as has been described with reference to FIGS. 4 and 5, it is possible effectively to avoid a disadvantageous situation in which the support member 4 protrudes a long distance rearward of the main body part 1, and a large amount of space is required on the table when using the tablet personal computer 100 in the table-placed state, and a disadvantageous situation in which the inclination angle of the touch panel-equipped liquid crystal panel 2 of the tablet personal computer 100 cannot be set greater than a certain angle.

Next is a description of variations of the tablet personal computer 100 according to the present embodiment with reference to the drawings.

Figure 7:
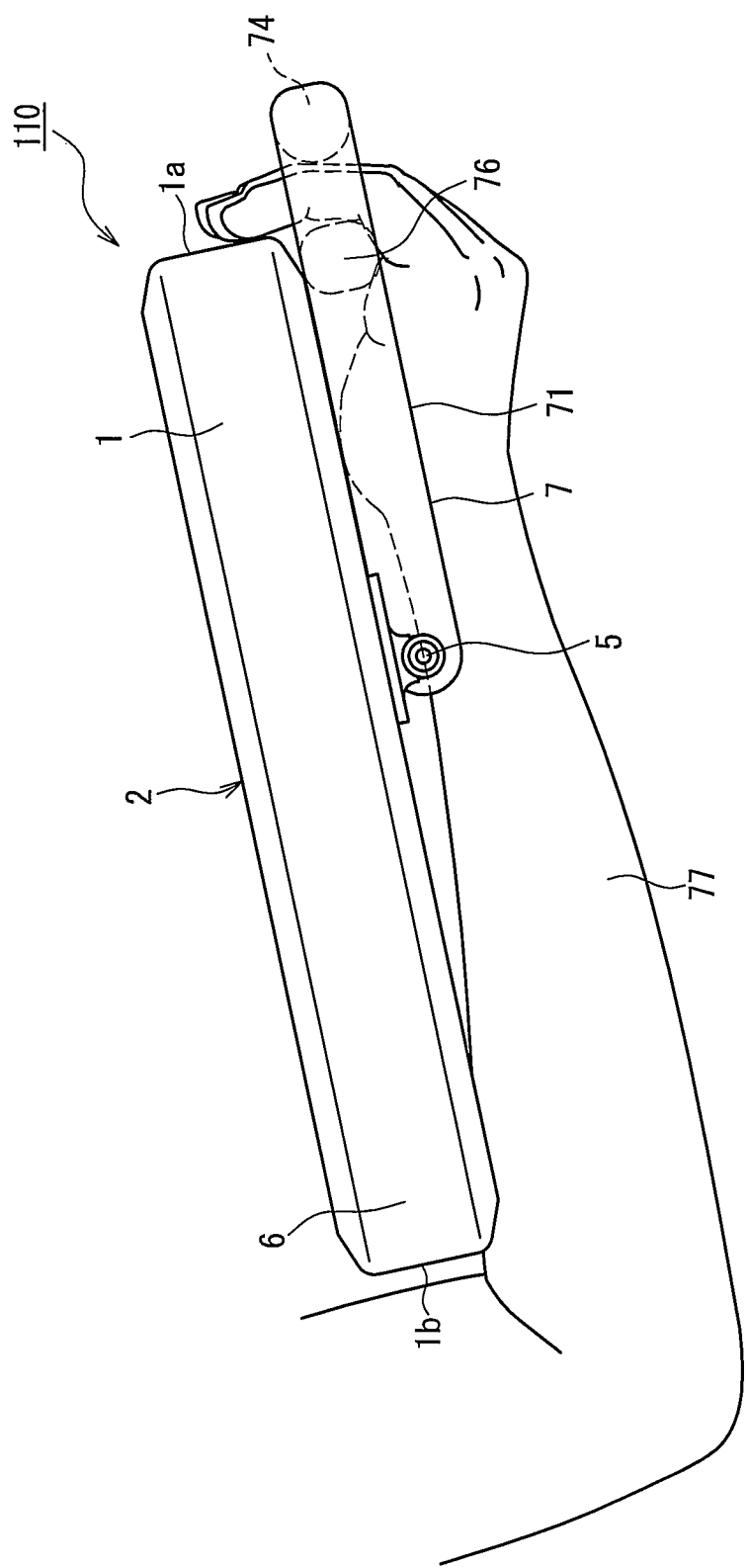
FIG. 7 is a side view showing how a first variation of the tablet personal computer according to the first embodiment is used while being held.

FIG. 7 is a side view showing a first variation of the tablet personal computer according to the present embodiment.

A tablet personal computer 110 according to the first variation shown in FIG. 7 differs from the tablet personal computer 100 according to the present embodiment shown in FIG. 1 only with respect to the shape of the support member 7, and the main body part 1 has the same shape. For this reason, the same reference signs have been given to the main body part 1, the touch panel-equipped liquid crystal panel 2, the pivot shaft 5 formed on the rear surface 3 of the main body part 1, and the elastic member 6 formed on the periphery of the main body part 1, and descriptions thereof will not be given.

In FIG. 7, leg parts 71 of a support member 7 of the tablet personal computer 110 according to the first variation are linear and do not have the inclined portions 13 that are inclined relative to the linear portions 12 as with the leg parts 11 of the tablet personal computer 100 of the present embodiment shown in FIG. 1.

In the case where this tablet personal computer 110 of the first variation is used in the hand-held state, when the support member 7 is positioned on the upward side of the main body part 1, and the leg parts 71 of the support member 71 are caused to cling to the rear surface 3 of the main body part 1 as shown in FIG. 7, the connection part 14 is in the state of protruding from the outer edge 1a of the main body part 1. In this state, by inserting their fingers between a connection part 74 and a bridge part 76 of the support member 7 and bringing their fingertips into contact with the outer edge 1a on the upper side of the main body part 1, the user can hold the tablet personal computer 110 using a lower arm part 77 with their wrist in a bent state.

As shown in FIG. 7, inserting the fingers between the connection part 74 and the bridge part 76 of the support member 7 enables easy suppression of movement such as twisting or rotating of the tablet personal computer 110, and since force from the fingers is applied to the bridge part 76 as well, the entire palm of the hand can be used to press the tablet personal computer 110 toward the elbow of the arm holding the outer edge 1b on the lower side of the tablet personal computer 110 so as to enable the tablet personal computer 110 to be held stably, unlike the case where only the outer edge 1a on the upper side of the main body part 1 is held.

Figure 8:
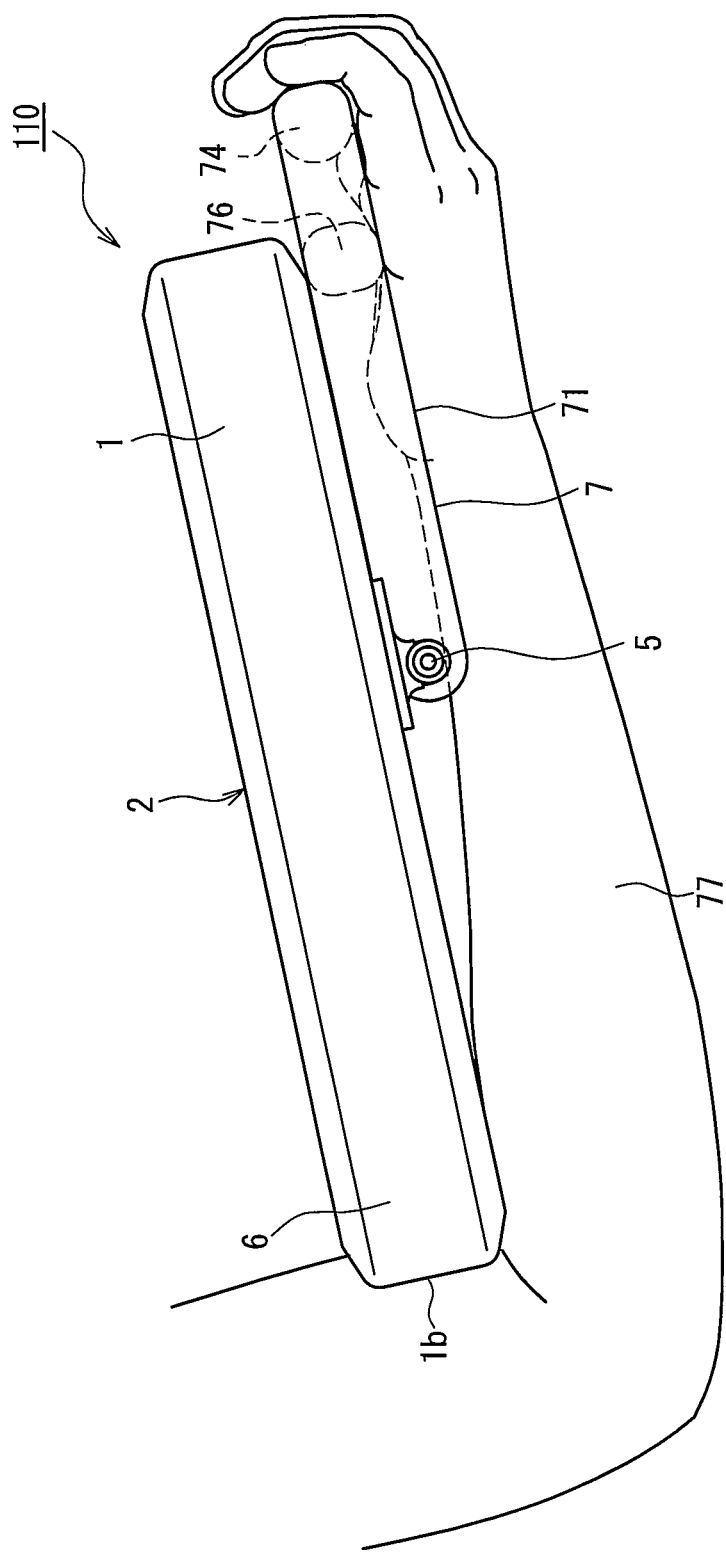
FIG. 8 is a side view showing how the first variation of the tablet personal computer according to the first embodiment is used while being held according to another method.

FIG. 8 is a side view showing the case where the tablet personal computer 110 according to the first variation of the present embodiment is used in a hand-held state according to another method. In FIG. 8, the user is holding the tablet personal computer 110 with their fingertips wrapped around the connection part 74 of the support member 7. In the case where the size of the tablet personal computer 110 is small, or the case where the user is an adult male and their upper arm part is relatively long, by holding the tablet personal computer 110 with their fingertips wrapped from outer side of the connection part as shown in FIG. 8, the outer edge 1b on the lower side of the main body part 1 easily can be pressed against the inner side of the elbow, and using this holding method instead of that shown in FIG. 7 enables more stable holding and using the tablet personal computer 110.

Note that even in the case of the tablet personal computer 110 shown in FIGS. 7 and 8 described as the first variation of the present embodiment, the support member 7 is positioned more rearward than the rear surface 3 of the main body part 1 is, and therefore external impact is received first by the support member 7 so as to enable reducing the influence of impact on the main body part 1.

Furthermore, although not shown, by pivoting the support member 7 to the lower side of the rear surface 3 of the main body part 1, the support member 7 of the tablet personal computer 110 of the first variation can also be allowed to function as a stand when the tablet personal computer 110 is used in the table-placed state.

Figure 9:
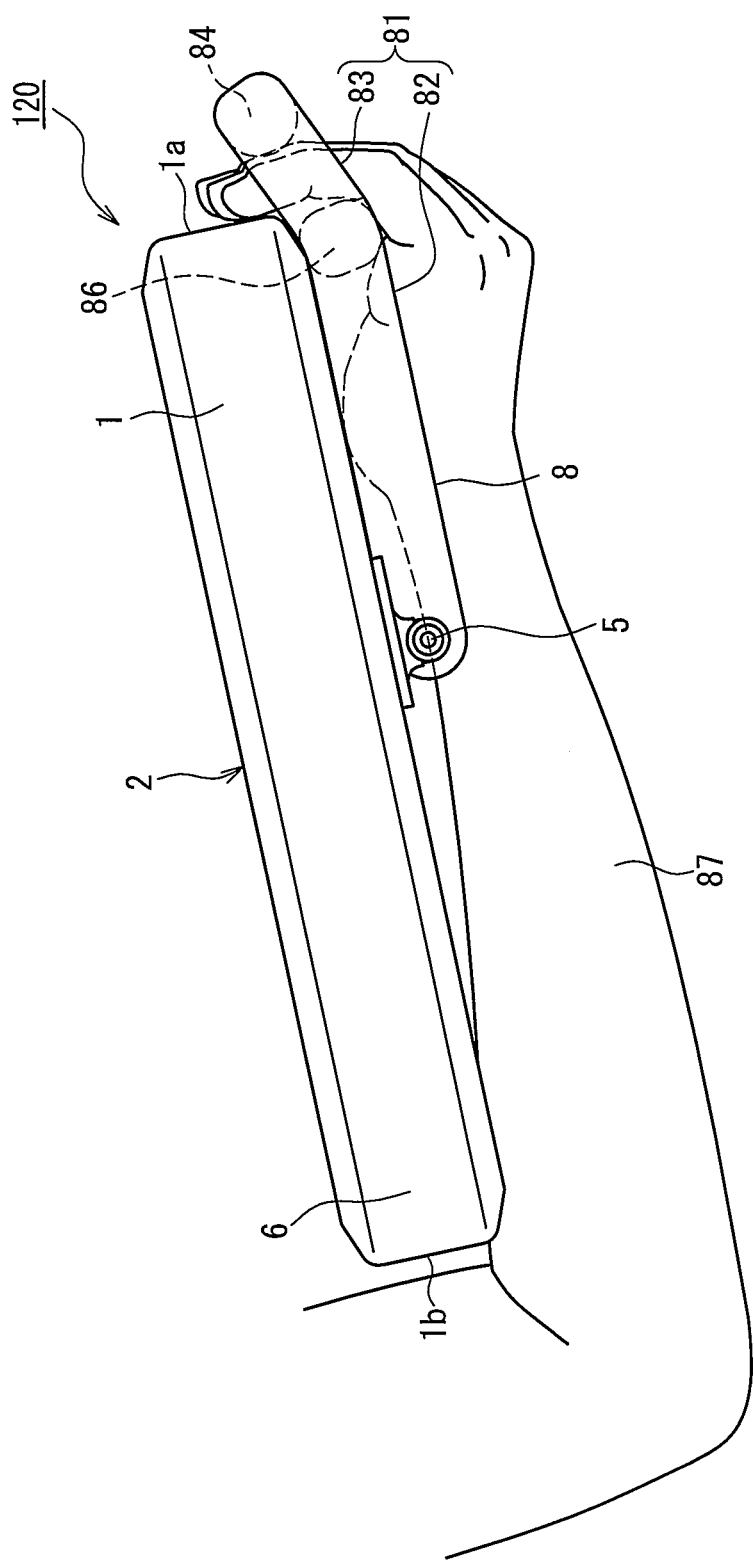
FIG. 9 is a side view showing how a second variation of the tablet personal computer according to the first embodiment is used while being held.

FIG. 9 is a side view showing a second variation of the tablet personal computer according to the present embodiment.

Also with a tablet personal computer 120 of the second variation shown in FIG. 9, the constituent elements other than a support member 8 are the same as those of the tablet personal computer 100 of the present embodiment shown in FIG. 1, and therefore the same reference signs have been given thereto, and descriptions thereof will not be given.

In FIG. 9, leg parts 81 of the support member 8 of the tablet personal computer 120 according to the second variation are each configured by a linear portion 82 and an inclined portion 83, but in a manner opposite to the support member 4 of the tablet personal computer 100 of the present embodiment shown in FIG. 1, the inclined portions 83 are inclined toward the front surface on which the touch panel-equipped liquid crystal display panel 2 is disposed.

Also with this tablet personal computer 120 of the second variation, by inserting their fingers between a connection part 84 and a bridge part 86 and holding the outer edge 1a on the upper side of the main body part 1 as shown in FIG. 9 for example, the user can press the outer edge 1b on the lower side against the inner side of their elbow and use the tablet personal computer 120 while securely holding it on the inner side of a forearm part 87.

As shown in FIG. 9, since the inclined portions 83 of the leg parts 81 are inclined forward in the tablet personal computer 120 of the second variation, the connection part 84 of the support member 8 is positioned so as to hang over the main body part 1. For this reason, in the case where the tablet personal computer 120 is moved while using the connection part 84 of the support member 8 as a grip (handle) for carrying, the connection part 84 is positioned directly above or in the vicinity of the center of gravity of the tablet personal computer 120, and therefore the user can carry the tablet personal computer 120 without a feeling of strangeness in terms of balance.

Furthermore, also with the tablet personal computer 120 of the second variation shown in FIG. 8, since the leg parts 81 of the support member 8 are positioned more rearward than the rear surface 3 of the main body part 1 is, in the case where external impact is applied, the impact is received first by the support member 8, thus enabling reduction of the influence of impact on the main body part 1. Furthermore, although not shown, by pivoting the support member 8 to the lower side of the rear surface 3 of the main body part 1, the support member 8 of the tablet personal computer 120 of the second variation can be allowed to function as a stand when the tablet personal computer 120 is used in the table-placed state.

Note that in the case where the tablet personal computer 120 according to the second variation of the present embodiment is held in the hand-held state, although a description has been given of only the case where the user holds the tablet personal computer 120 by inserting their fingers between the connection part 84 and the bridge part 86 of the support member 8 as shown in FIG. 9, needless to say it is possible for the user to hold the tablet personal computer 120 by wrapping their fingers around the connection part 84 of the support member 8 and pressing the support member 8 with the entirety of their palm as shown in FIG. 8 as the second variation of holding the tablet personal computer 110 of the first variation.

Furthermore, also with the tablet personal computers 110 and 120 according the first variation shown in FIGS. 7 and 8 and the second variation shown in FIG. 9, in the case where the size of the tablet personal computer is small, or the case where the user has a long upper arm part, the tablet personal computer 110 or 120 can be held by gripping the connection part 74 or 84 of the support member 7 or 8.

Moreover, also with the tablet personal computers 110 and 120 according the first variation shown in FIGS. 7 and 8 and the second variation shown in FIG. 9, it is possible to employ a configuration in which the bridge part 76 or 86 is not formed in the support member 7 or 8, or a configuration in which multiple bridge parts 76 or 86 are formed.

Second Embodiment

Next is a description of a second embodiment of a tablet personal computer of the present invention. The tablet personal computer of the second embodiment differs from the above-described tablet personal computer of the first embodiment with respect to the shape of the support member.

Figure 10:
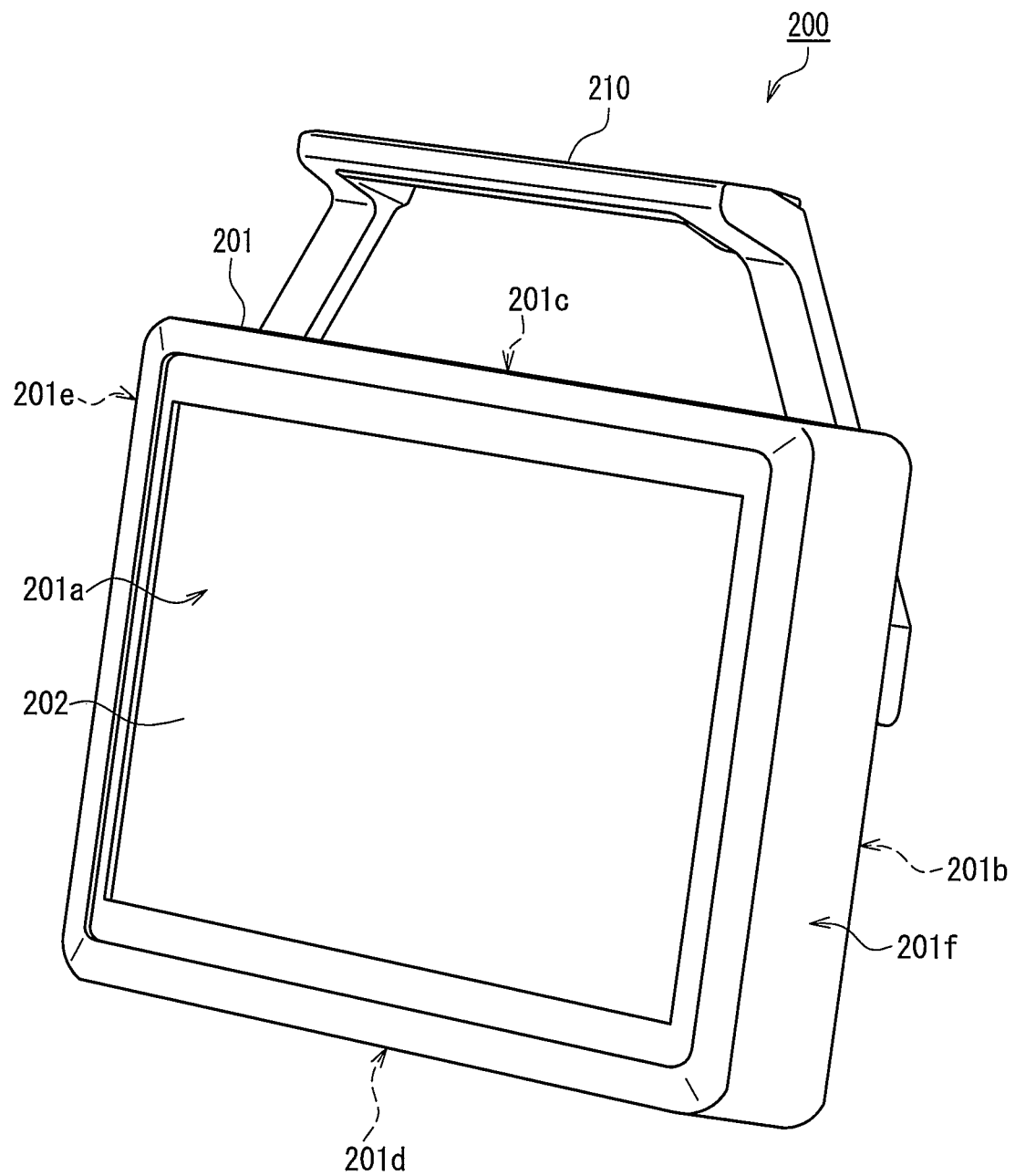
FIG. 10 is a perspective diagram showing an external configuration of a tablet personal computer according to a second embodiment.

FIG. 10 is a perspective diagram of the tablet personal computer according to the second embodiment as viewed from the front surface side direction. A main body part 201 of a tablet personal computer 200 has a front surface 201a on which a touch panel-equipped liquid crystal panel 202 is disposed, and a rear surface 201b positioned on the rearward side. Note that for the sake of convenience in the description of the tablet personal computer 200 of the second embodiment, the various surfaces of the casing constituting the main body part 201 are referred to as the front surface 201a, the rear surface 201b, a top surface 201c, a bottom surface 201d, a side surface 201e, and a side surface 201f. A detailed description of the main body part 201 of the tablet personal computer 200 will not be given since it is basically the same as the main body part 1 of the tablet personal computer 100 described in the first embodiment.

The tablet personal computer 200 includes a support member 210 on the rear surface 201b.

Figure 11:
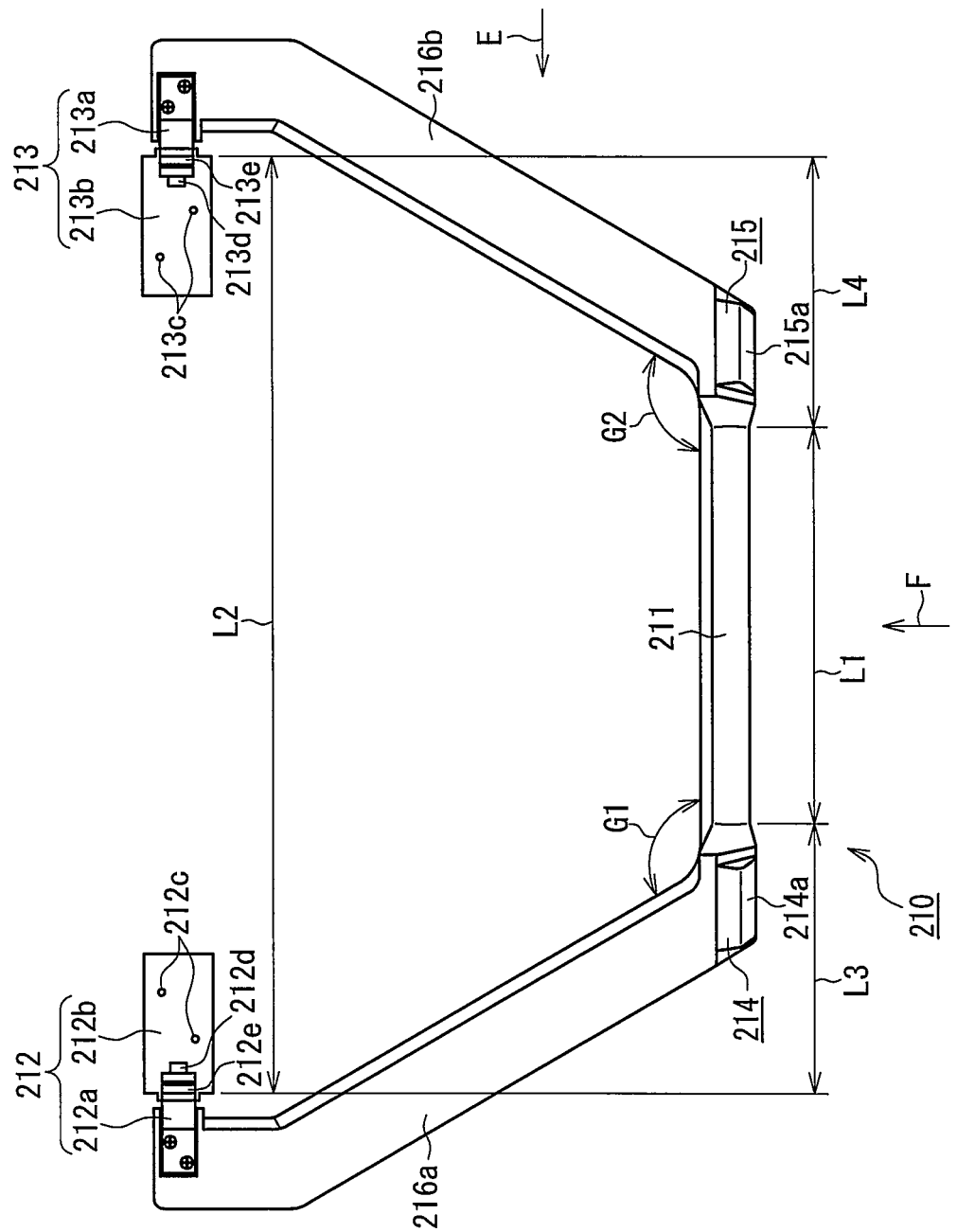
FIG. 11 is a plan view of a handle member of the tablet personal computer according to the second embodiment.
Figure 12:
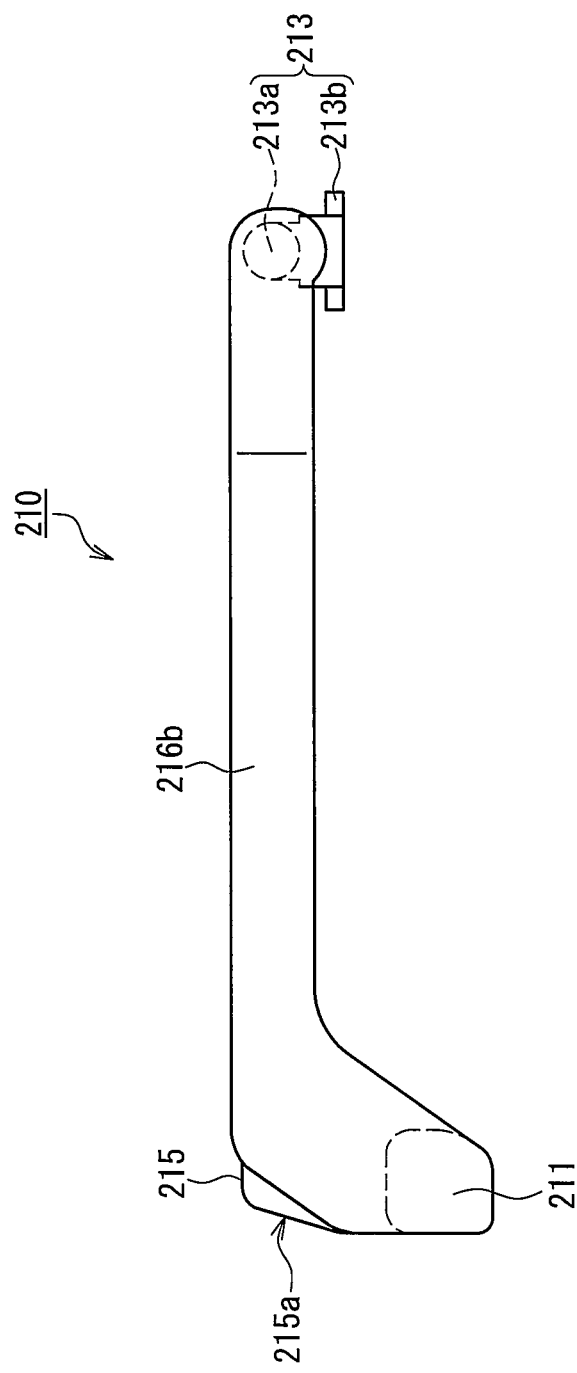
FIG. 12 is a side view of the handle member of the tablet personal computer according to the second embodiment.
Figure 13:
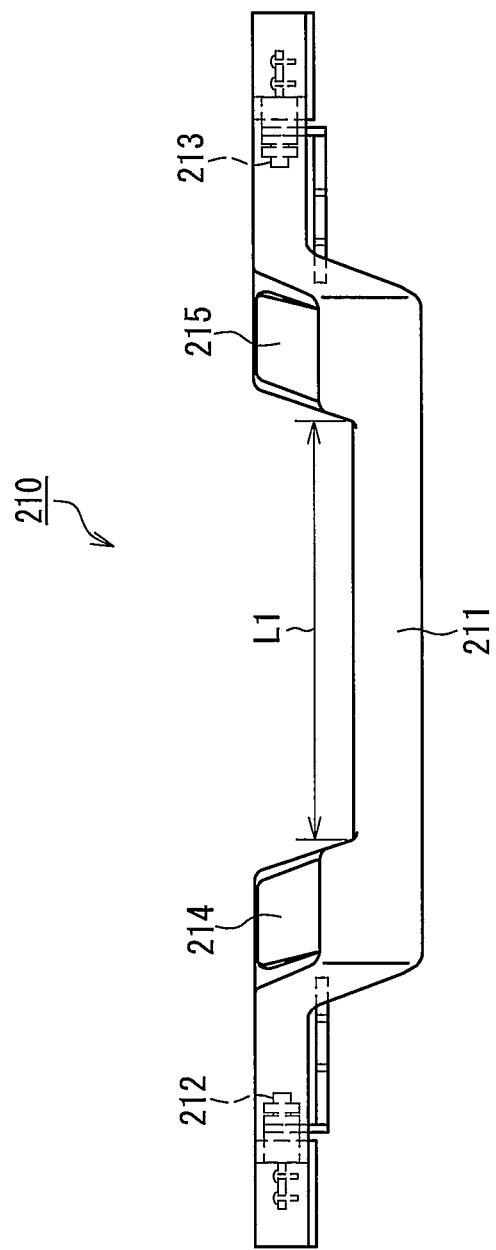
FIG. 13 is a side view of the handle member of the tablet personal computer according to the second embodiment, as viewed from a different direction.

FIG. 11 is a plan view of the support member 210 as viewed from the rear surface 201b side of the main body part 201 of the tablet personal computer 200. FIG. 12 is a side view of the support member 210 as viewed from the direction indicated by arrow E in FIG. 11. FIG. 13 is a side view of the support member 210 as viewed from the direction indicated by arrow F in FIG. 11.

As shown in FIG. 11, the support member 210 is formed such that the planar shape is substantially "C" shaped. The support member 210 has a pair of leg parts 216a and 216b and a connection part 211 that connects end parts on one side of the leg parts 216a and 216b.

In the support member 210 of the tablet personal computer 200 of the present embodiment, end parts of the leg parts 216a and 216b that are on the side different from the end parts connected by the connection part 211 are attached to pivot shafts 212d and 213d of pivot mechanisms 212 and 213 that are disposed on the rear surface 201b of the main body part 201. The support member 210 is pivotally attached to the rear surface 201b of the main body part 201 due to the pivot mechanisms 212 and 213 being directly attached to the rear surface 201b of the main body part 201. A first foot part 214 and a second foot part 215 are provided respectively in connection portions between the connection part 211 and the leg parts 216a and 216b.

The connection part 211 is a portion that can be gripped by the user. Although the cross-sectional shape of the connection part 211 of the present embodiment is a prism having rounded corners as shown in FIG. 12, the cross-sectional shape of the connection part 211 can be another shape such as a circular or elliptical cylinder. It is preferable to, for example, form ridges and valleys conforming to the shape of a human hand in the connection part 211 in order to facilitate gripping by the user. Also, it is possible to enable the user to more reliably grip the connection part 211 by, for example, forming the surface of the connection part 211 as a roughened surface.

It is preferable that a length L1 of the connection part 211 in the lengthwise direction is, for example, greater than or equal to 100 mm in order to facilitate gripping by the user's hand. Note that the gap between the first foot part 214 and the second foot part 215 can be shortened by making the length L1 of the connection part 211 as short as possible, thus making it possible to more easily absorb a difference in height and planarity between the first foot part 214 and the second foot part 215, and improve stability when the tablet personal computer is placed on a flat surface, for example. Also, the length L1 of the connection part 211 is required to be greater than or equal to the size of the hand of the user who is gripping the connection part 211, and it is preferable that the length L1 of the connection part 211 is approximately 100 mm to 150 mm, for example. The connection part 211 can be formed using various types of materials. In order to ensure strength, it is preferable that the connection part 211 is formed from a metal such as magnesium, and it is further preferable that the surface of the metal is covered by an elastomeric resin or the like due to the ability to, for example, suppress damage to the rear surface 201b and the like.

The first pivot mechanism 212 is integrally joined to the end part of the first leg part 216a on the side opposite to the other end part that is joined to the connection part 211. The first pivot mechanism 212 includes a hinge mechanism 212a and a support plate 212b. The hinge mechanism 212a includes a pivot shaft 212d and multiple washers 212e. The pivot shaft 212d is fixed to the support plate 212b. Included among the washers 212e are a washer fixed to the pivot shaft 212d and a washer fixed to the first leg part 216a. The washers 212e are pressed against each other, and a load is generated when the washer fixed to the first leg part 216a rotates along with the pivoting of the first leg part 216a relative to the first pivot mechanism 212. Holes 212c through which a screw (described later) can be inserted are formed in the support plate 212b. The support plate 212b is screwed to the rear surface 201b of the main body part 201 using screws (described later). It is preferable that multiple holes 212c are formed to improve the strength of the attachment of the support plate 212b.

The second pivot mechanism 213 is integrally joined to the end part of the second leg part 216b on the side opposite to the other end part that is joined to the connection part 211. The second pivot mechanism 213 includes a hinge mechanism 213a and a support plate 213b. The hinge mechanism 213a includes a pivot shaft 213d and multiple washers 213e. The pivot shaft 213d is fixed to the support plate 213b. Included among the washers 213e are a washer fixed to the pivot shaft 213d and a washer fixed to the second leg part 216b. The washers 213e are pressed against each other, and a load is generated when the washer fixed to the second leg part 216b rotates along with the pivoting of the second leg part 216b relative to the second pivot mechanism 213. Holes 213c through which a screw (described later) can be inserted are formed in the support plate 213b. The support plate 213b is screwed to the rear surface 201b of the main body part 201 using screws (described later). It is preferable that multiple holes 213c are formed due to the ability to improve the strength of the attachment of the support plate 213b.

The first foot part 214 is disposed in the vicinity of one end part of the first leg part 216a (the position where the first leg part 216a and the connection part 211 are joined). The first foot part 214 is disposed at a position on the support member 210 according to which the first foot part 214 comes into contact with a table surface when, for example, the tablet personal computer 200 is disposed in an upright posture. Note that "upright posture" refers to the state in which the tablet personal computer is placed on a table surface using the support member as a stand as described with reference to FIGS. 4 and 5 in the first embodiment. The first foot part 214 can be fixed to the first leg part 216a using a screw or an adhesive. The first foot part 214 can be formed using a resin material having so-called elastomeric characteristics, such as a copolymer resin or an internal plasticizing resin having elasticity or viscoelasticity, or a resin having rubber elasticity. The first foot part 214 can be formed using a thermoplastic polyether-ester elastomer (TPEE), for example. Although the first foot part 214 is formed in the shape of triangular prism in the present embodiment, another shape such as a semicircular column may be used. The first foot part 214 includes a ground contact surface 214a. It is preferable that the ground contact surface 214a is formed at a position on the first foot part 214 according to which the ground contact surface 214a comes into contact with the table surface when the tablet personal computer 200 is disposed in an upright posture, due to the fact that the material whose surface is "tacky" has the characteristic of preventing sliding. Although the ground contact surface 214a is a flat surface in the present embodiment, it may be a curved surface.

The second foot part 215 is disposed in the vicinity of one end part of the second leg part 216b (the position where the second leg part 216b and the connection part 211 are joined). The second foot part 215 is disposed at a position on the support member 210 according to which the second foot part 215 comes into contact with a table surface when, for example, the tablet personal computer 200 is disposed in an upright posture. The second foot part 215 can be fixed to the second leg part 216b using a screw or an adhesive. The second foot part 215 can be formed using a resin material having so-called elastomeric characteristics, such as a copolymer resin or an internal plasticizing resin having elasticity or viscoelasticity, or a resin having rubber elasticity. The second foot part 215 can be formed using a thermoplastic polyether-ester elastomer (TPEE), for example. Although the second foot part 215 is formed in the shape of triangular prism in the present embodiment, another shape such as a semicircular column may be used. The second foot part 215 includes a ground contact surface 215a. It is preferable that the ground contact surface 215a is formed at a position on the second foot part 215 according to which the ground contact surface 215a comes into contact with the table surface when the tablet personal computer 200 is disposed in an upright posture, due to the fact that the material whose surface is "tacky" has the characteristic of preventing sliding. Although the ground contact surface 215a is a flat surface in the present embodiment, it may be a curved surface.

One end part of the first leg part 216a is integrally joined to one end part of the connection part 211, and the other end part of the first leg part 216a is integrally joined to the first pivot mechanism 212. Although the cross-sectional shape of the first leg part 216a is a four-sided prism, there is no limit to this shape. It is preferable that the first leg part 216a is formed from a metal such as magnesium in order to ensure strength, and it is further preferable that the surface of the metal is covered by an elastomeric resin or the like due to the ability to suppress damage to the rear surface 201b and the like when the first leg part 216a is engaged with the rear surface 201b and the like of the tablet personal computer 200. The first leg part 216a is joined at an angle G1 shown in FIG. 11 relative to the connection part 211. It is preferable that the angle G1 is greater than or equal to 90 degrees in the configuration in which the connection part 211 is gripped, and it is further preferable that the angle G1 is 90 degrees to 120 degrees taking into consideration the shape stability obtained by increasing the rigidity of the support member 210 (the connection part 211 in particular) and postural stability when the tablet personal computer 200 is placed on a table surface while being supported by the support member 210.

One end part of the second leg part 216b is integrally joined to one end part of the connection part 211, and the other end part of the second leg part 216b is integrally joined to the second pivot mechanism 213. Although the cross-sectional shape of the second leg part 216b is a four-sided prism, there is no limit to this shape. It is preferable that the second leg part 216b is formed from a metal such as magnesium in order to ensure strength, and it is further preferable that the surface of the metal is covered by an elastomeric resin or the like due to the ability to suppress damage to the rear surface 201b and the like when the second leg part 216b is engaged with the rear surface 201b and the like of the tablet personal computer 200. The second leg part 216b is joined at an angle G2 shown in FIG. 11 relative to the connection part 211. It is preferable that the angle G2 is greater than or equal to 90 degrees in the configuration in which the connection part 211 is gripped, and it is further preferable that the angle G2 is 90 degrees to 120 degrees taking into consideration the shape stability obtained by increasing the rigidity of the support member 210 (the connection part 211 in particular) and postural stability when the tablet personal computer 200 is placed on a table surface while being supported by the support member 210.

Note that in the present embodiment, the length L1 of the connection part 211 and a gap L2 between the first pivot mechanism 212 and the second pivot mechanism 213 are set so as to be in the dimension relationship shown below.

L1<L2

Also, with respect to the pivot shaft direction of the first pivot mechanism 212 and the second pivot mechanism 213, a gap L3 between one end of the connection part 211 and the first pivot mechanism 212 and a gap L4 between the other end of the connection part 211 and the second pivot mechanism 213 are in the dimension relationship shown below.

L3=L4

As a result of setting the dimensions L1 to L4 so as to be in the above dimension relationships, the connection part 211 is positioned so as to be centered in the pivot shaft direction of the first pivot mechanism 212 and the second pivot mechanism 213. This stabilizes the weight balance when the user transports the tablet personal computer 200 by gripping the connection part 211 with their hand.

Figure 14:
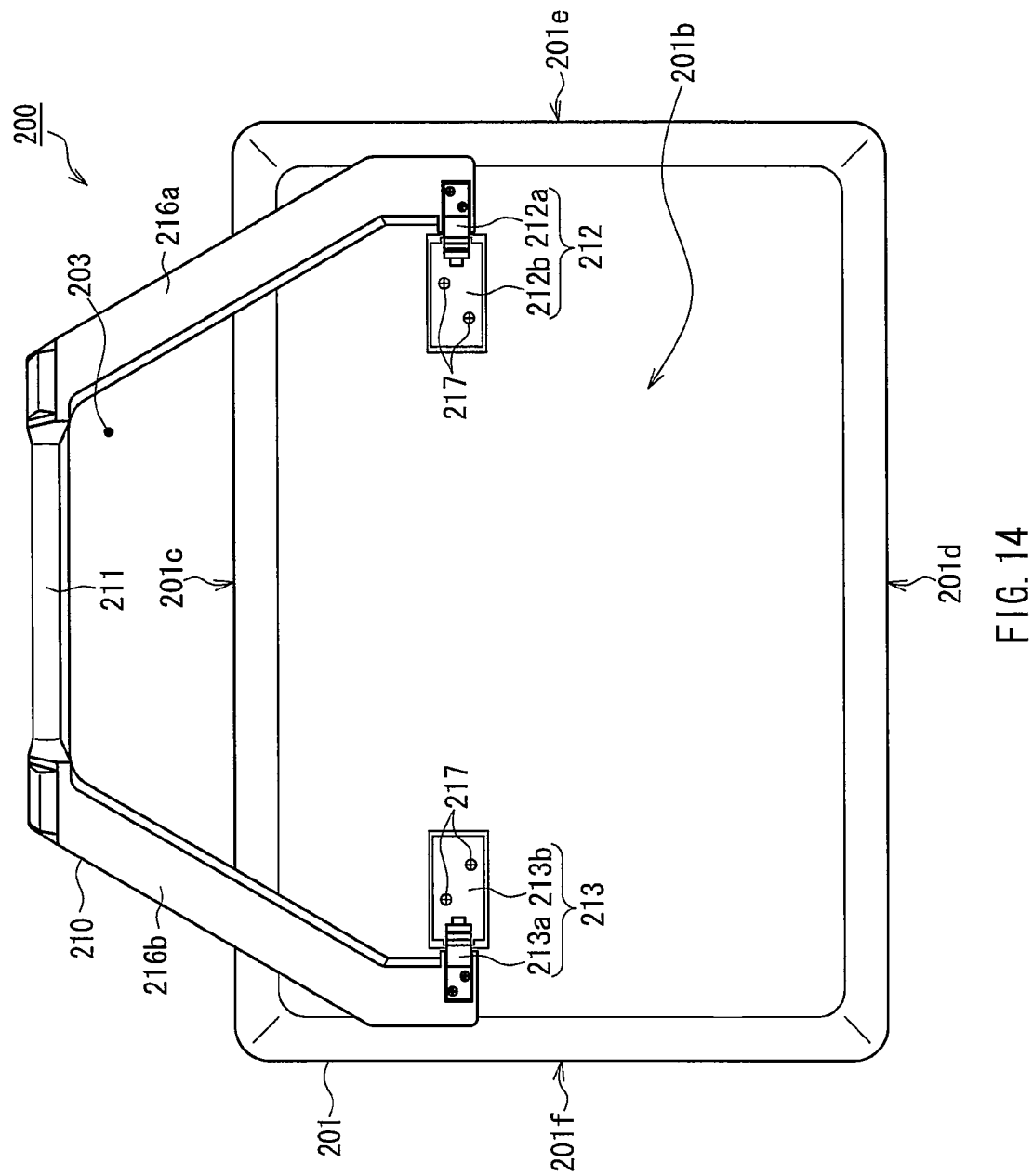
FIG. 14 is a rear view of the tablet personal computer according to the second embodiment.

FIG. 14 is a rear view of the state in which the support member 210 is fixed to the tablet personal computer 200. FIG. 14 also shows the state in which the support member 210 has been pivoted to the pivot end on the top surface 201c side of the main body part 201. Note that although there are cases where the internal structure of the first pivot mechanism 212 and the second pivot mechanism 213 is actually not visible from the outside due to being covered by a cover or the like, the cover or the like has been omitted from FIG. 14 in order to clearly show the internal structure of the first pivot mechanism 212 and the second pivot mechanism 213.

As shown in FIG. 14, the support member 210 is fixed to the rear surface 201b of the tablet personal computer 200 by the support plates 212b and 213b being screwed to the rear surface 201b of the tablet personal computer 200 using screws 217.

The support member 210 is disposed so as to be exposed to the rear surface 201b of the tablet personal computer 200.

When the support member 210 is at the pivot end, which is the position shown in FIG. 14, the connection part 211 and part of the first leg part 216a and the second leg part 216b protrude from a plane parallel to the rear surface 201b of the tablet personal computer 200 in the direction of the plane, that is to say, protrude beyond the top surface 201c. Also, a void 203 is formed between the connection part 211 and the tablet personal computer 200.

Figure 15:
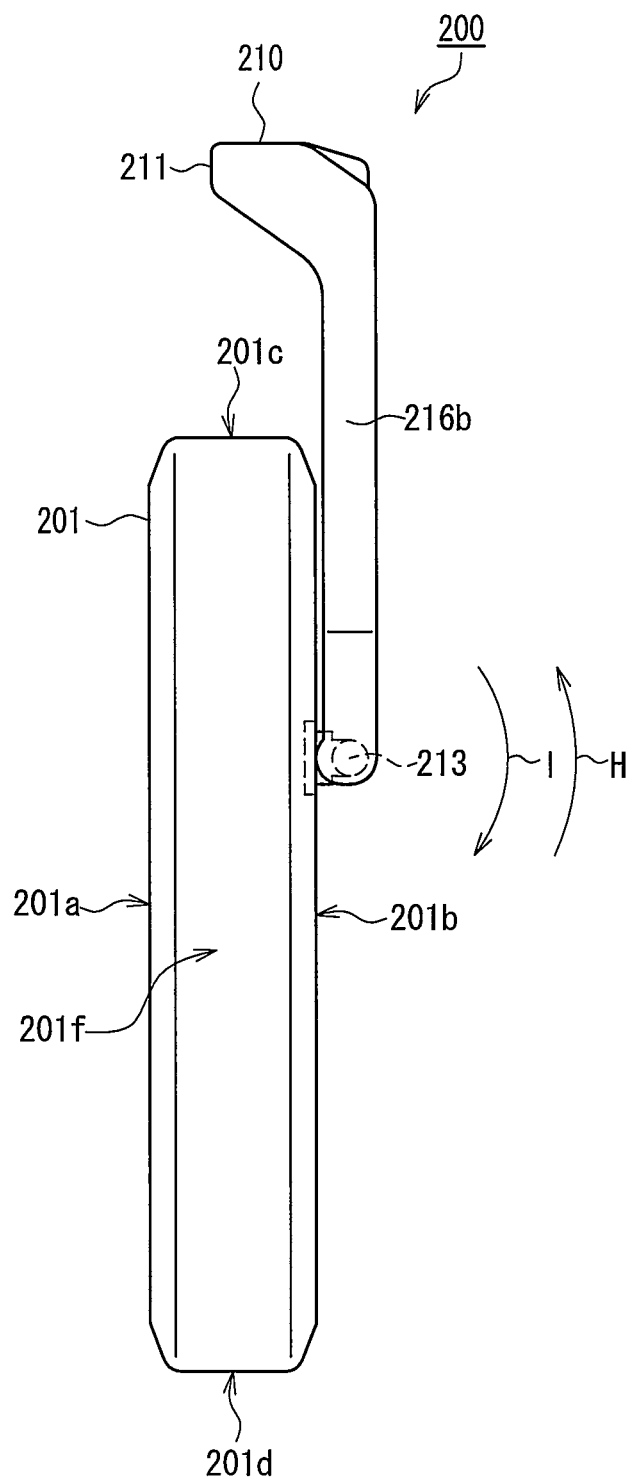
FIG. 15 is a side view showing a state in which the support member is in a first pivot position in the tablet personal computer according to the second embodiment.
Figure 16:
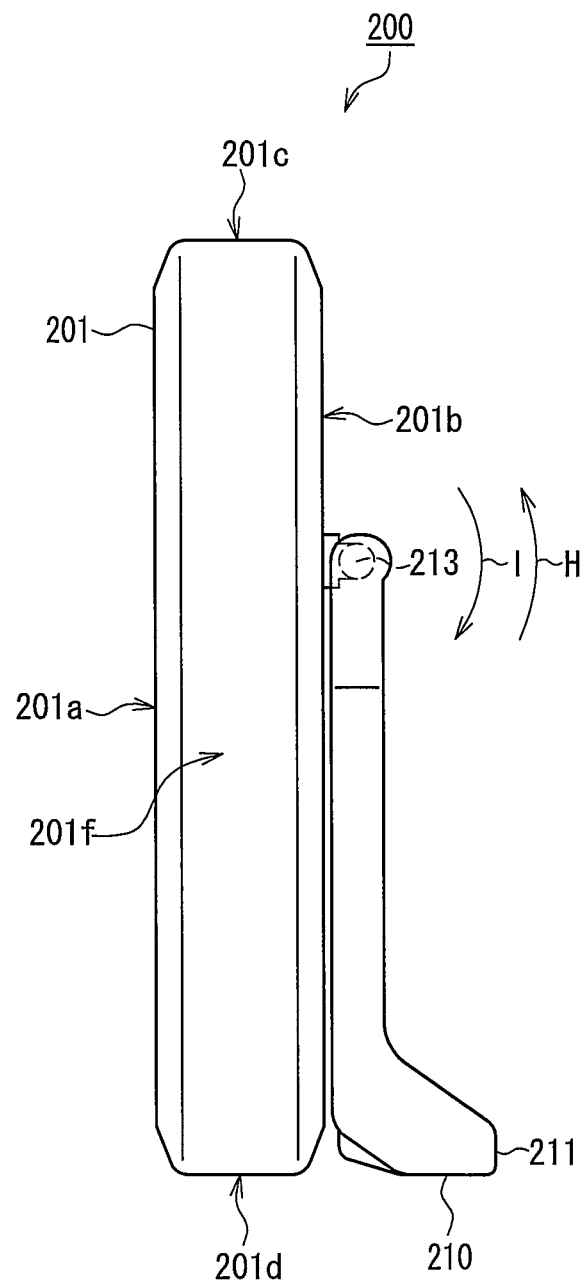
FIG. 16 is a side view showing a state in which the support member is in a third pivot position in the tablet personal computer according to the second embodiment.

FIGS. 15 and 16 are side views of the tablet personal computer 200. FIG. 15 shows the state in which the support member 210 is in the first pivot position. FIG. 16 shows the state in which the support member 210 is in the third pivot position.

Figure 17:
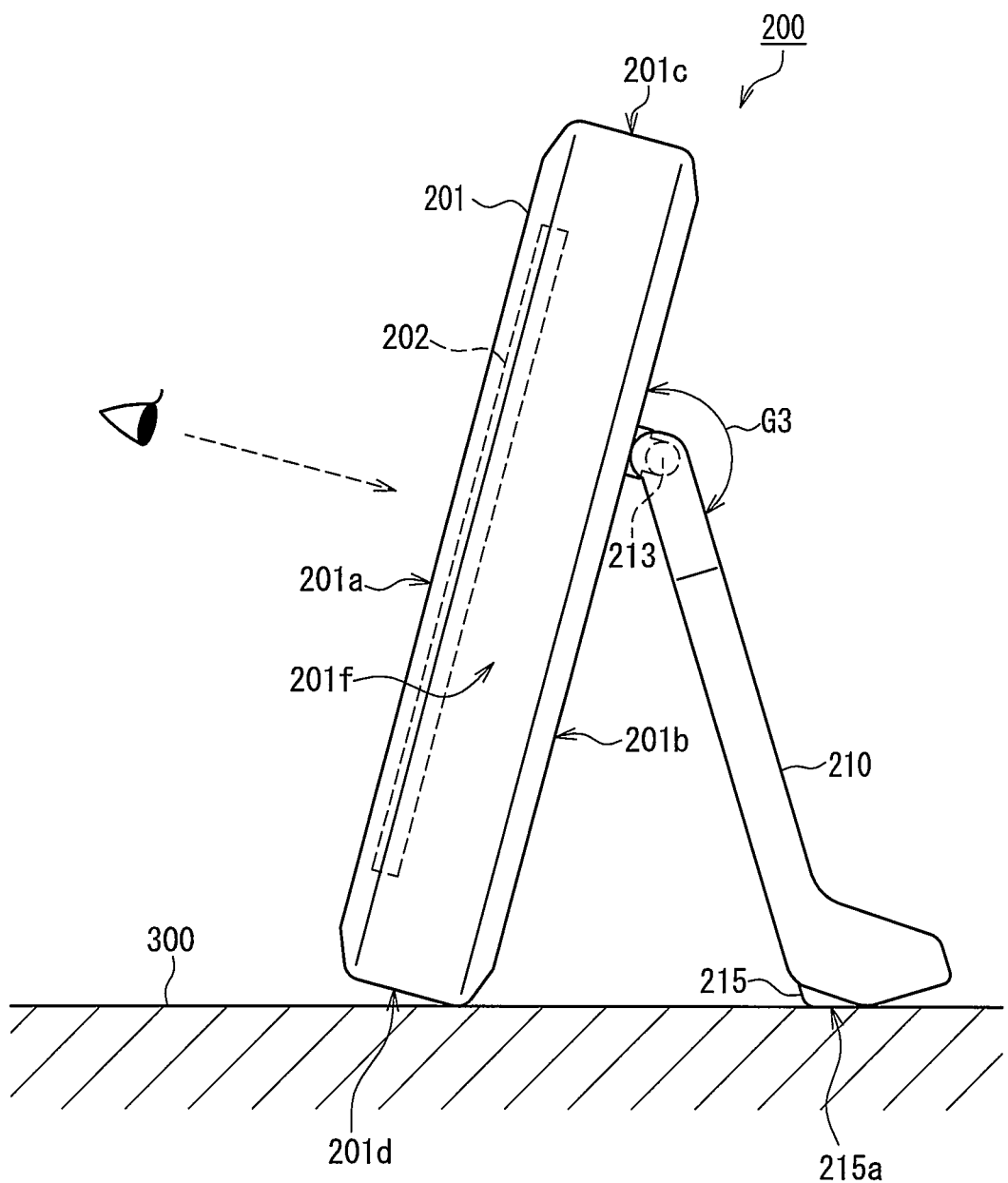
FIG. 17 is a side view showing a state in which the tablet personal computer according to the second embodiment is being used while being placed on a table.

The support member 210 can be in the first pivot position shown in FIG. 15 and the third pivot position shown in FIG. 16, and can pivot between the first pivot position and the third pivot position as shown in FIG. 17, which is described later. As shown in FIG. 15, the first pivot position is a position at which the support member 210 has pivoted to the pivot end on the top surface 201c side of the tablet personal computer 200.

As shown in FIG. 16, the third pivot position is a position at which the support member 210 has pivoted to the pivot end on the bottom surface 201d side of the main body part 201. The support member 210 can also be fixed at a predetermined position between the first pivot position and the third pivot position.

When the support member 210 is in the position shown in FIG. 15, pivoting of the support member 210 in the direction indicated by arrow H is restricted since the first leg part 216a and the second leg part 216b are in contact with or closest to the rear surface 201b of the tablet personal computer 200. In other words, the first pivot position is the pivot end of the support member 210 in the direction indicated by arrow H. When in the position shown in FIG. 15, the support member 210 can pivot in only the direction indicated by arrow I.

When the support member 210 is displaced from the first pivot position shown in FIG. 15 in the direction indicated by arrow I, the support member 210 pivots in the direction indicated by arrow I while being supported by the tip part 212a of the first pivot mechanism 212 and the tip part 213a of the second pivot mechanism 213. At this time, the support plates 212b and 213b do not pivot due to being fixed to the tablet personal computer 200.

The support member 210 can be pivoted to the third pivot position shown in FIG. 16. When the support member 210 is in the position shown in FIG. 16, pivoting of the support member 210 in the direction indicated by arrow I is restricted since the first leg part 216a and the second leg part 216b are in contact with or closest to the rear surface 201b of the tablet personal computer 200. In other words, the third pivot position is the pivot end of the support member 210 in the direction indicated by arrow I. When in the position shown in FIG. 16, the support member 210 can pivot in only the direction indicated by arrow H.

When the support member 210 is displaced from the third pivot position shown in FIG. 16 in the direction indicated by arrow H, the support member 210 pivots in the direction indicated by arrow H while being supported by the tip parts 212a and 213a. At this time, the support plates 212b and 213b do not pivot due to being fixed to the tablet personal computer 200.

Since the rotating torque (load) in the pivot mechanisms 212 and 213 has been set relatively high, the support member 210 can be immobilized and fixed at an arbitrary angle between the first pivot position and the third pivot position. Specifically, letting 0 degrees be the angle of the first leg part 216a relative to the rear surface 201b when the support member 210 is in the first position shown in FIG. 15, and letting 180 degrees be the angle of the first leg part 216a relative to the rear surface 201b when the support member 210 is in the third pivot position shown in FIG. 16, the pivot mechanisms 212 and 213 have a rotating torque according to which the support member 210 can be immobilized and fixed at an arbitrary angle between 0 and 180 degrees.

Note that although the support member 210 can be immobilized at an arbitrary angle between 0 and 180 degrees due to using rotating torque in the pivot mechanisms 212 and 213 in the present embodiment, the support member 210 can be immobilized at set angles between 0 and 180 degrees by providing the pivot mechanisms 212 and 213 with a click mechanism. A click mechanism is a configuration in which, for example, protrusions and recessions are provided in the multiple washers of the pivot mechanisms 212 and 213, and a clicking feeling is produced when the protrusions and recessions fit into each other at predetermined angles. Note that "set angles" refers to pivot angles of the support member 210 at which a clicking feeling is produced, and these set angles can be set using the positions of the protrusions and recessions formed in the washers included in the pivot mechanisms 212 and 213.

FIG. 17 is a side view showing the state in which the tablet personal computer 200 is supported in an upright posture using the support member 210. The support member 210 shown in FIG. 17 is in the second pivot position.

As shown in FIG. 17, by setting a pivot angle G3 of the support member 210 to 160 degrees for example, the main body part 201 can be disposed on a table surface 300 while being supported in an upright posture. When in the second pivot position shown in FIG. 17, the support member 210 is immobilized due to being subjected to rotating torque by the washers included in the pivot mechanisms 212 and 213. Note that since the support member 210 can be immobilized at an arbitrary angle by the pivot mechanisms 212 and 213, the pivot angle G3 is not limited to 160 degrees, and the support member 210 can be immobilized at another angle. In other words, the tablet personal computer 200 can be disposed on the table surface 300 in an upright posture by immobilizing the support member 210 at an arbitrary second pivot position. This enables the user to adjust the angle of the touch panel-equipped liquid crystal panel 202 to an arbitrary angle.

When the support member 210 is in the second pivot position shown in FIG. 17, the ground contact surfaces 214a and 215a of the first foot part 214 and the second foot part 215 (only the second foot part 215 is shown in FIG. 17) are in contact with the table surface 300. At this time, although the ground contact surfaces 214a and 215a may be in point contact or linear contact with the table surface 300, it is preferable that they are in planar contact with the table surface 300 in consideration of the postural stability of the tablet personal computer 200. When the main body part 201 is in the upright posture shown in FIG. 17, a portion of the main body part 201 in the vicinity of the boundary between the rear surface 201b and the bottom surface 201d is in contact with the table surface 300.

As shown in FIG. 17, the tablet personal computer 200 is disposed on the table surface 300 so as to be inclined at a predetermined angle, and therefore the touch panel-equipped liquid crystal panel 202 is somewhat facing upward relative to the table surface 300. Accordingly, the user facing the touch panel-equipped liquid crystal panel 202 more easily can be directly in front of the display surface of the touch panel-equipped liquid crystal panel 202, thus enabling the user more easily to view images displayed on the touch panel-equipped liquid crystal panel 202.

Figure 18:
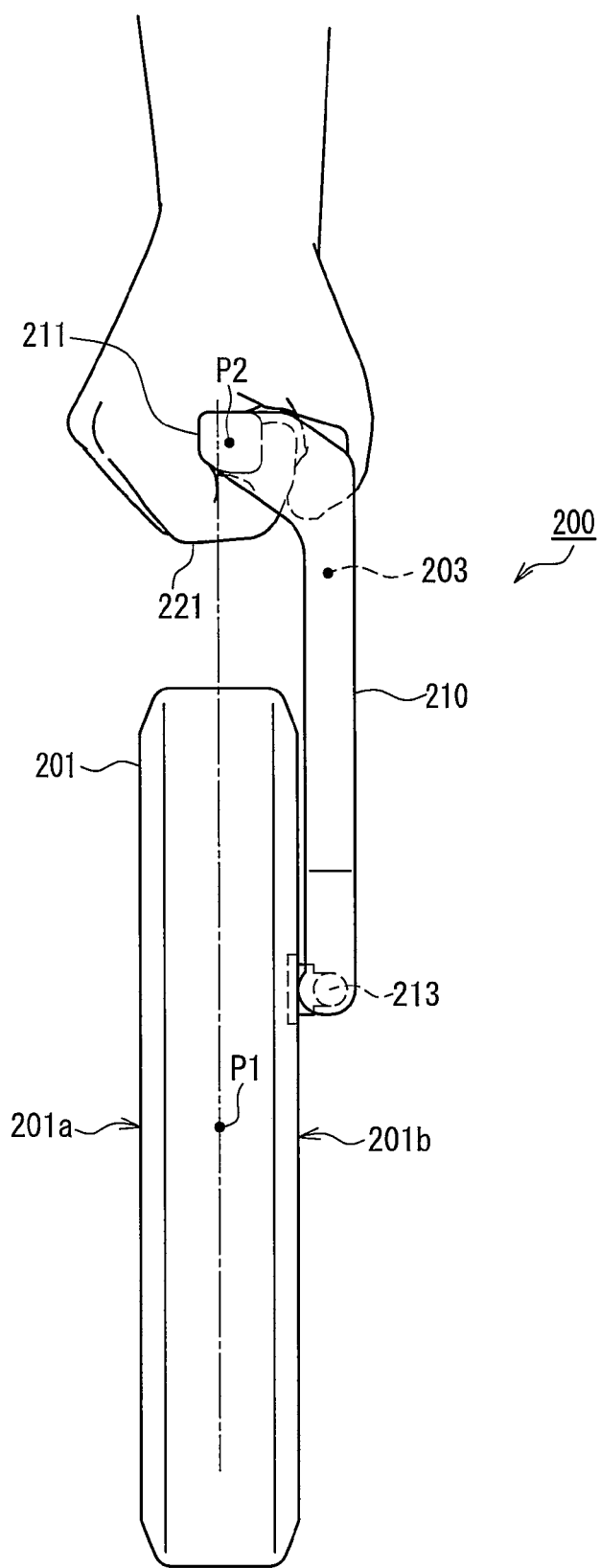
FIG. 18 is a side view showing a state in which the support member of the tablet personal computer according to the second embodiment is being gripped by a user.

FIG. 18 is a side view showing the state in which the tablet personal computer 200 is transported using the support member 210. The support member 210 shown in FIG. 18 is in the first pivot position shown in FIG. 15.

When in the first pivot position, the support member 210 is immobilized due to being subjected to rotating torque by the washers included in the pivot mechanisms 212 and 213.

As shown in FIG. 18, the user can grip the connection part 211 by inserting fingers 221 of their hand in the void 203 of the support member 210.

The support member 210 is shaped such that when in the first pivot position as shown in FIG. 18, a center of gravity P1 of the tablet personal computer 200 and a shaft center P2 of the connection part 211 are substantially aligned with each other. Accordingly, when the user grips the connection part 211 with their hand, the tablet personal computer 200 is put into a posture in which the front surface 201a and the rear surface 201b are parallel with a vertical line, and thus the tablet personal computer 200 can be transported in a stable posture.

Also, since the support member 210 is shaped such that the center of gravity P1 of the main body part 201 and the shaft center P2 of the connection part 211 are substantially aligned with each other, when the user grips the connection part 211 and transports the tablet personal computer 200 with the main body part 201 hanging in the vertical direction, the tablet personal computer 200 can be transported with the front surface 201a of the main body part 201 facing toward the user, or with the rear surface 201b of the main body part 201 facing toward the user. Note that as one example of a shape according to which the center of gravity P1 of the main body part 201 and the shaft center P2 of the connection part 211 are substantially aligned with each other, the connection part 211 can be disposed at a position overlapping the center of gravity P1 of the main body part 201 in the vertical direction, that is to say, a range in which the center of gravity P1 of the main body part 201 is at a position not outside the diameter of the connection part 211.

Figure 19:
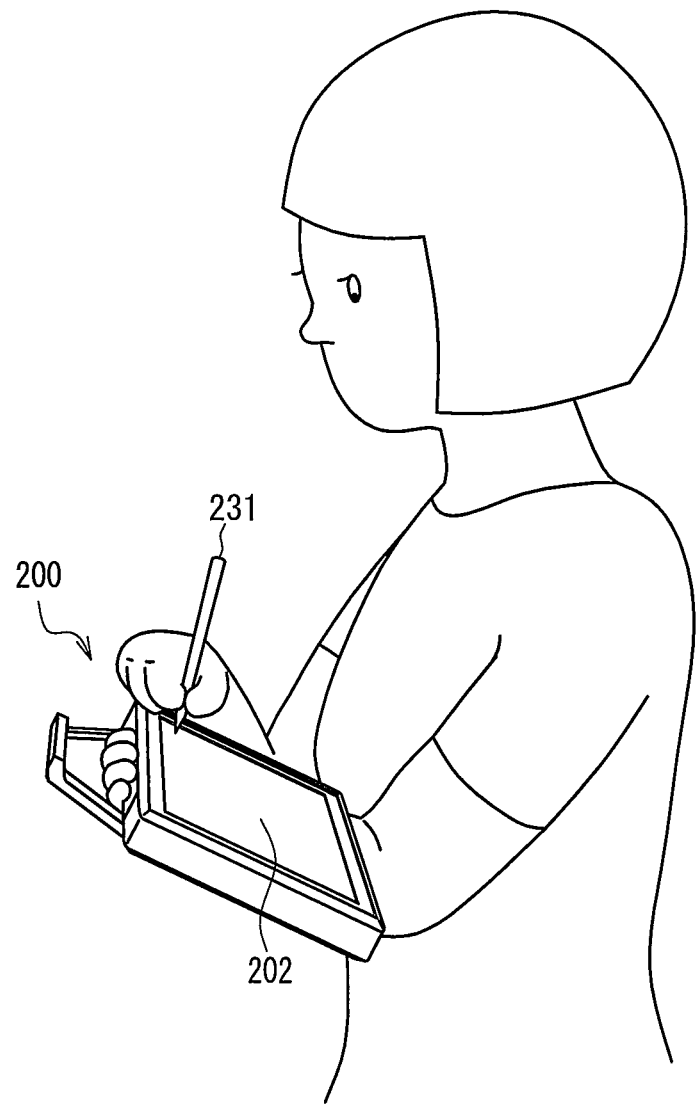
FIG. 19 is a perspective diagram showing how a user holds the tablet personal computer according to the second embodiment in a hand-held state.
Figure 20:
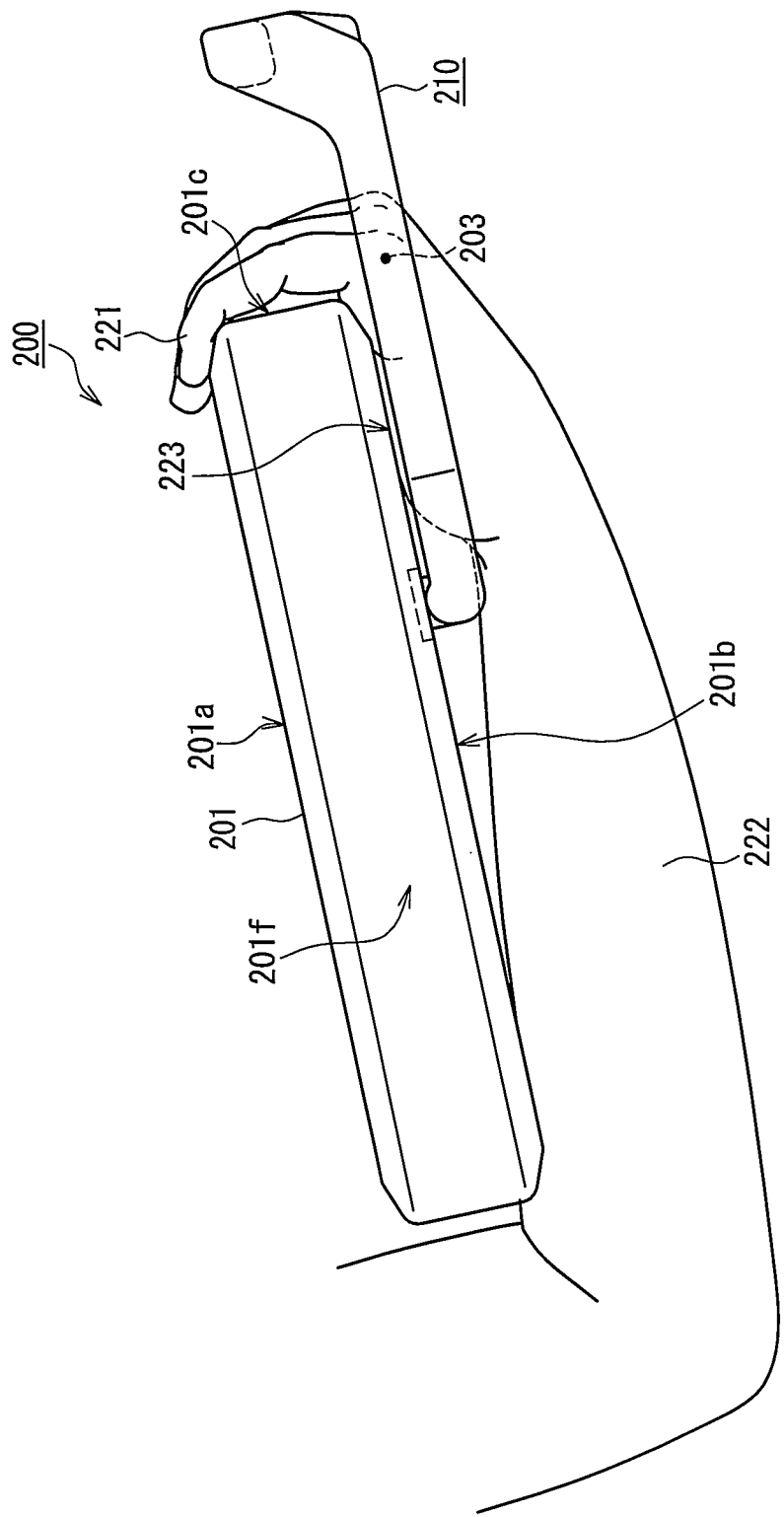
FIG. 20 is a side view showing how the user holds the tablet personal computer according to the second embodiment in the hand-held state.

FIG. 19 is a perspective diagram showing the state in which the tablet personal computer 200 is operated while being held by the user. FIG. 20 is a side view of the state in which the user is gripping the tablet personal computer 200 as shown in FIG. 19.

In the case where the user operates the tablet personal computer 200 while holding the main body part 201 with one hand, first the support member 210 is displaced to the first pivot position. Next, the tablet personal computer 200 is placed on the left arm, for example, as shown in FIG. 19, and an input pen 231 held in the right hand is brought into contact with the touch panel-equipped liquid crystal panel 202 at an arbitrary position. Specifically, as shown in FIG. 20, the fingers 221 of the hand are inserted into the void 203 between the support member 210 and the tablet personal computer 200, and then brought into contact with the top surface 201c and the front surface 201a of the tablet personal computer 200. Also, the tablet personal computer 200 lies on an arm 222 and a palm 223.

Accordingly, the user can hold the tablet personal computer 200 with one hand, specifically the left hand in the example shown in FIGS. 19 and 20.

Note that although the support member 210 is displaced to the first pivot position in the use mode shown in FIGS. 19 and 20, the tablet personal computer 200 can be held by one hand with the support member 210 being at a different pivot angle as long as the hand or arm can be inserted into the void 203.

Also, in the use mode shown in FIG. 20, in the case where the user's arm (the left arm in the example shown in FIG. 20) is long, a configuration is possible in which the connection part 211 is gripped using the left hand as shown in FIG. 3 in the first embodiment. Note that with this configuration as well, the support member 210 remains in the state of being immobilized with respect to the tablet personal computer 200, and the ability to performs operations on the touch panel using the input pen 231 as shown in FIG. 19, for example, is not hindered.

In the present embodiment as well, at least a portion (e.g., the connection part 211) of the support member 210 is disposed so as to be exposed to the rear surface 201b of the tablet personal computer 200, and therefore when the support member 210 is in the first pivot position shown in FIG. 15 or the third pivot position shown in FIG. 16 for example, in the case where the tablet personal computer 200 is accidentally dropped onto the floor or the like, there is a high possibility that the connection part 211 and/or the support member 210 first comes into contact with the site of impact, and therefore the impact transmitted to the tablet personal computer 200 can be reduced. This reduces the possibility of the tablet personal computer 200 being damaged. In particular, in the case where the entirety of the support member 210 is exposed to the rear surface 201b of the tablet personal computer 200 and positioned the most rearward, and the tablet personal computer 200 is dropped onto the floor or the like while the user is holding the main body part 201 as shown in FIG. 19, there is a high possibility that the tablet personal computer 200 will fall in a posture such that the rear surface 201b is facing vertically downward. In this case, since the support member 210 is disposed on the rear surface 201b of the tablet personal computer 200, there is a high possibility that the support member 210 will collide with the floor or the like before the tablet personal computer 200, and therefore the possibility of the tablet personal computer 200 being damaged is reduced due to the support member 210 absorbing the impact transferred to the tablet personal computer 200.

According to the present embodiment, the support member 210 is provided with the first foot part 214 and the second foot part 215, and therefore since the support member 210 does not readily slide on the table surface when it is put in the upright form, the inclination angle of the main body part 201 is stable when the tablet personal computer 200 is in the upright posture.

According to the present embodiment, as shown in FIG. 2, the angle G1 between the connection part 211 and the first leg part 216a and the angle G2 between the connection part 211 and the second leg part 216b are each set to 90 degrees or more, and the length L1 of the connection part 211 and the gap L2 between the first pivot mechanism 212 and the second pivot mechanism 213 are set in the dimension relationship "L1<L2", thus improving shape stability through increasing the rigidity of the support member 210 (the connection part 211 in particular) and postural stability when the tablet personal computer 200 is placed on a table surface while being supported by the support member 210.

Note that in the present embodiment, in order to substantially align the center of gravity P1 of the tablet personal computer 200 and the shaft center P2 of the connection part 211 with each other, the shaft center P2 of the connection part 211 is shifted out of alignment with the pivot shafts 212d and 213d of the pivot mechanisms 212 and 213, but in the case where the center of gravity P1 of the tablet personal computer 200 is closer to the rear surface 201b, there are cases where the center of gravity P1 of the tablet personal computer 200 and the shaft center P2 of the connection part 211 can be substantially aligned with each other even without shifting the shaft center P2 of the connection part 211 out of alignment with the pivot shafts 212d and 213d of the pivot mechanisms 212 and 213.

Also, although the support member 210 is provided with the first foot part 214 and the second foot part 215 in the present embodiment, these foot parts are not essential. For example, the foot parts can be omitted in the case where the connection part 211 or end parts on one side of the first leg part 216a and the second leg part 216b are formed from a material that has elasticity.

Both of the above embodiments describe that the support member is directly fixed to the rear surface of the main body parts 1 and 201. However, the electronic apparatus of the present invention is not limited to an electronic apparatus in which the support member is directly fixed to the main body part.

Figure 21:
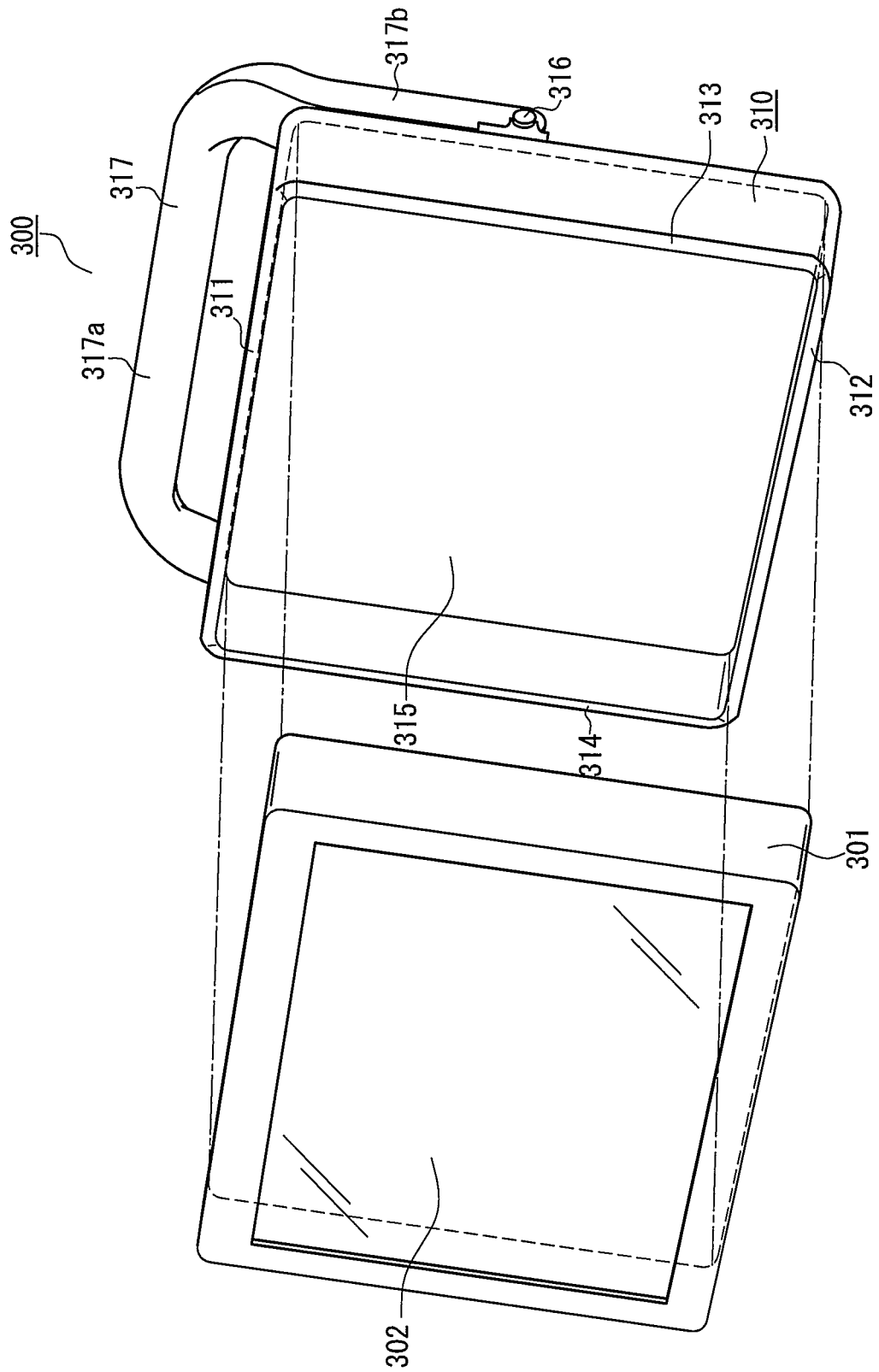
FIG. 21 is an exploded perspective diagram showing an electronic apparatus according to a variation.
Figure 22A:
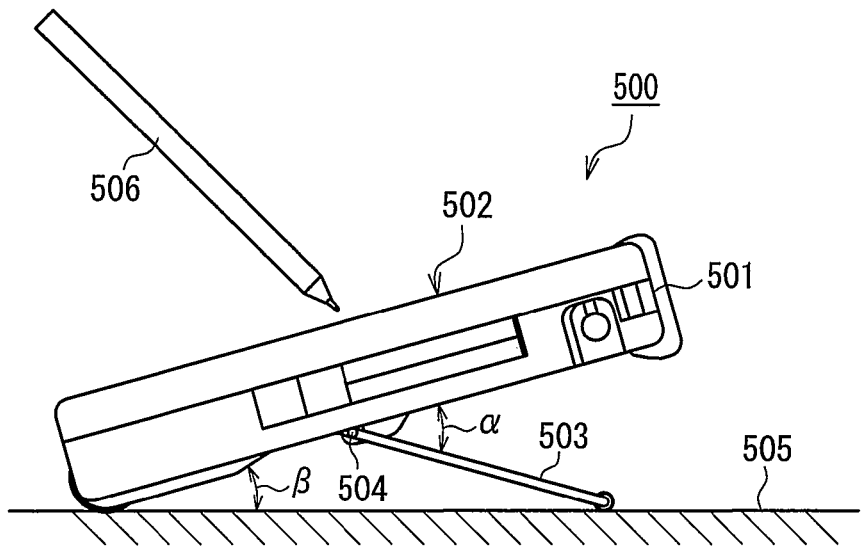
FIGS. 22A and 22B are diagrams showing use modes of a conventional electronic apparatus.
Figure 22B:
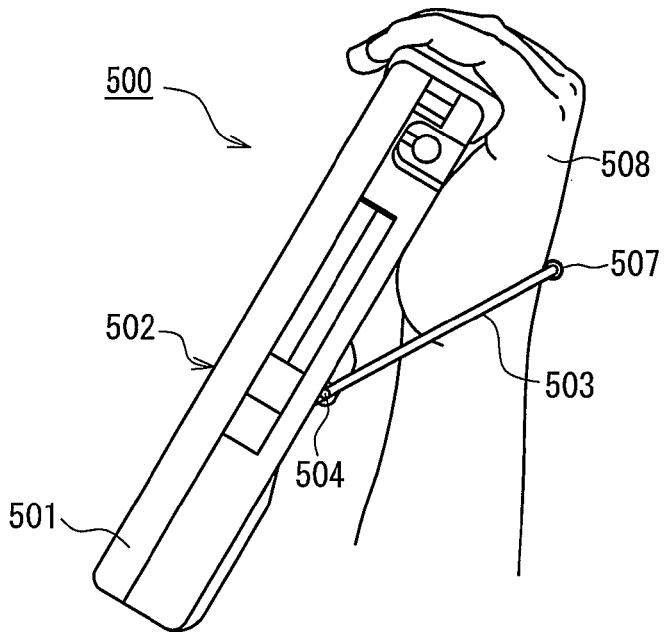

FIG. 21 is an exploded perspective diagram of an electronic apparatus according to a variation in which a main body support part that supports the main body part is provided.

As shown in FIG. 21, in an electronic apparatus 300 according to the present variation, a support member 317 is not directly connected to a main body part 301 including a touch panel-equipped liquid crystal panel 302 serving as a display panel.

In the electronic apparatus 300 of the present variation, the support member 317 is pivotally attached to a pivot shaft 316 that is disposed on the rear surface side of the main body support part 310 that can support the main body part 301.

The main body support part 310 includes a top frame 311 that comes into contact with the upper side surface of the main body part 301, a bottom frame 312 that comes into contact with the lower side surface of the main body part 301, a right frame 313 that comes into contact with the right side surface of the main body part 301, a left frame 314 that comes into contact with the left side surface of the main body part 301, and a bottom surface 315 that comes into contact with the rear surface of the main body part 301. The main body part 301 is housed inside the main body support part 310.

The support member 317, which is fixed to the main body support part 310, has a connection part 317a that connects a pair of leg parts 317b, and the support member 317 has the same shape as the support member 4 described in the first embodiment shown in FIG. 1. Of course, the support member 210 described in the second embodiment shown in FIG. 10 or a support member having another shape can be used as the support member 317.

According to the variation shown in FIG. 21, a tablet personal computer whose main body part is not provided with a support member can be used to, as necessary, obtain an electronic apparatus including a support member required by the user.

Note that although FIG. 21 shows the example where the main body support part 310 includes the bottom surface 315 that comes into contact with the bottom surface of the main body part 301, the main body support part may be a hollow frame-shaped member that does not include a bottom surface. Not including a bottom surface enables further reduction in the weight of the main body support part.

The strength of the main body support part not including a bottom surface can be reinforced by providing, in place of the bottom surface, a reinforcing member that connects at least a pair of frame parts disposed opposing each other on the rear surface side, such as the top frame 311 and the bottom frame 312, and/or the right frame 313 and the left frame 314. Also, the support member can be pivotally fixed to the reinforcing member disposed on the rear surface side.

In both the case of using a main body support part that does not include a bottom surface, and the case of using a main body support part that includes a bottom surface as shown in FIG. 21, the support member can be fixed to two opposing frame parts of the main body support part, such as the right frame 313 and the left frame 314. Here, the support member can be fixed to the faces of the right frame 313 and the left frame 314 that are on the rear surface side. Also, the support member 317 can be fixed to an outer surface portion of the right frame 313 and the left frame 314, that is to say, the surface on the side opposite to the side on which the main body part 301 is disposed, so as to protrude outward from the main body support part on both sides.

Note that the main body part and the main body support part can be connected using a known method for connecting two members, such as threaded engagement using screws, or mating engagement using parts formed on the members. Of course, in the case where the main body support part and the main body part are shaped such that the main body part does not readily fall out of the main body support part, the main body part may merely be fitted into the main body support part, or the main body support part and the main body part can be fixed together using an adhesive.

Note that in the case of the configuration in which the support member is connected to the main body part via the main body support part as shown in FIG. 21, there are no limitations on the material of the main body part 301 or the main body support part 310, as well as the support member 317. For example, in view of ruggedness, impact resistance can be improved by forming the outer shell of the main body part 301 from a metal, and likewise to the first embodiment and the second embodiment described above, applying an AS based resin as the support member 310 and particularly an elastomeric resin or the like as the corner portions of the main body support part.

As described above, according to the tablet personal computer of the present embodiment, the user can hold the tablet personal computer stably in the hand-held state by utilizing the support member in holding, instead of directly holding the main body part. Also, the support member can function as a stand in the case of using the tablet personal computer while being placed on a table, and furthermore as a member for protecting the rear surface of the main body part of the tablet personal computer from impact due to dropping and the like. This enables obtaining a tablet personal computer that is user-friendly in both hand-held use and table-placed use, and furthermore is highly reliable with respect to external impact.

Note that among the above embodiments, the support member 4 described in the first embodiment is shaped such that the pair of leg parts are disposed parallel with each other. Also, the support member 210 described in the second embodiment has a shape in which the leg parts are disposed such that the connection part side is narrower than the side attached to the main body part. However, these are merely illustrative examples, and regarding the support member used in the electronic apparatus according to the present invention, the shape of the disposition of the pair of leg parts, the shape of the leg parts themselves, and the shape of the connection part can be appropriately selected according to, for example, the object and application of the electronic apparatus, and the size and weight of the main body part.

Also, the tablet personal computers 100, 200, and 300 are examples of an electronic apparatus. Although the portable tablet personal computers 100, 200, and 300 including a main body part formed by a single casing have been given as examples of the electronic apparatus according to the embodiments of the present invention, the present invention may be applied to an electronic apparatus other than a computer device, as long as it is an electronic apparatus that can at least be transported and operated while be gripped by hand by a user. Also, there is no limitation to a single casing in the electronic apparatuses according to the embodiments of the present invention, and the present invention may be applied to a computer device that includes multiple casings, such as an ordinary notebook personal computer. The present invention is also applicable to various types of electronic apparatuses that include various types of display panels having touch panel functionality, such as various types of portable information devices, PDAs, and portable gaming devices.

Also, it is not an essential requirement for the display panel to include touch panel functionality as described in the above embodiments, and it is possible to omit functionality as an input unit from the display panel, and control operations of the electronic apparatus by, for example, disposing operation buttons, switches, and the like on side surface portions of the main body part and a so-called frame portion formed in the periphery of the display panel.

An electronic apparatus according to the present invention can be used in various types of applications as an electronic apparatus that improves user-friendliness in both a hand-held state and a table-placed state and is also resistant to impact due to dropping and the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic apparatus comprising: a main body part that is a tablet computer; and a support member that supports the main body part and acts as a handle of the main body part, wherein the support member includes a pair of leg parts, and a connection part to be gripped by a user that is formed rigidly and integrally with the pair of leg parts and located between the pair of leg parts, the connection part defining the handle, the pair of leg parts of the support member is rotatably attached to a pivot mechanism fixed on a reverse surface of the main body part so that the pair of leg parts and the connection part rigidly and integrally rotate in an angle range of at least 90 degrees, the pivot mechanism is configured to allow the support member to be displaced between a first pivot position and a second pivot position that is at least 90 degrees away from the first pivot position, in the first pivot position, when the main body part is viewed from a front surface, the connection part of the support member is exposed from an upper end of the main body part, and positioned frontward relative to the pair of leg parts, so that the connection part is located above the upper end of the main body part, and in the second pivot position, an angle formed between the pair of leg parts of the support member and the reverse surface of the main body part is less than 90 degrees, and the connection part is positioned backward from the pair of leg parts.

2. The electronic apparatus according to claim 1, wherein foot parts protrude from surfaces of the pair of leg parts, and the foot parts are present at intersections of the connection part and the pair of leg parts.

3. The electronic apparatus according to claim 1, wherein in the first pivot position, when viewed from a side surface, the center of the connection part is positioned frontward relative to the pivot mechanism, and the connection part is located directly above the upper end of the main body part.

4. The electronic apparatus according to claim 1, wherein one end of each of the pair of leg parts is connected to the pivot mechanism, and an other end of each of the pair of leg parts is connected to the connection part.

5. The electronic apparatus according to claim 1, wherein the pivot mechanism is fixed to a flat portion of the reverse surface of the main body part.

6. The electronic apparatus according to claim 1, wherein the connecting part consists of a straight rod-shaped portion that connects the pair of leg parts.

7. The electronic apparatus according to claim 1, wherein in the first and second pivot positions, the rotation of the pair of leg parts toward the reverse surface is restricted while the pair of leg parts keeping parallel to the reverse surface.

* * * * *